US012212911B2

(12) United States Patent
Zhang et al.

(10) Patent No.: US 12,212,911 B2
(45) Date of Patent: Jan. 28, 2025

(54) EARPHONES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN); Zeying Zheng, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/628,789

(22) Filed: Apr. 7, 2024

(65) Prior Publication Data

US 2024/0251192 A1 Jul. 25, 2024

Related U.S. Application Data

(63) Continuation of application No. 18/501,012, filed on Nov. 2, 2023, now Pat. No. 11,956,584, which is a (Continued)

(30) Foreign Application Priority Data

Oct. 28, 2022 (CN) ......................... 202211336918.4
Dec. 1, 2022 (CN) ......................... 202223239628.6

(Continued)

(51) Int. Cl.
*H04R 1/10* (2006.01)

(52) U.S. Cl.
CPC ......... *H04R 1/1008* (2013.01); *H04R 1/1041* (2013.01); *H04R 1/105* (2013.01)

(58) Field of Classification Search
CPC ..... H04R 1/1008; H04R 1/1041; H04R 1/105
See application file for complete search history.

(56) References Cited

U.S. PATENT DOCUMENTS

2004/0138723 A1* 7/2004 Malick ................ H04R 25/552 607/57
2007/0009133 A1 1/2007 Gerkinsmeyer (Continued)

FOREIGN PATENT DOCUMENTS

CN 110958526 A 4/2020
CN 111698608 A 9/2020

(Continued)

OTHER PUBLICATIONS

International Search Report in PCT/CN2023/083542 mailed on Jul. 11, 2023, 7 pages.

(Continued)

*Primary Examiner* — Simon King
(74) *Attorney, Agent, or Firm* — METIS IP LLC

(57) ABSTRACT

The present disclosure provides an earphone comprising a sound production component and an ear hook. In a wearing state, the ear hook is configured to place the sound production component at a position near an ear canal but not blocking the ear canal. An inner contour of the ear hook's projection on a user's sagittal plane includes a first curve having an extremum point in a first direction. The first direction is perpendicular to a long-axis direction of a projection of the sound production component on the sagittal plane. The extremum point is located behind a projection point of an upper vertex of the ear hook on the sagittal plane, and the upper vertex is a highest point of an inner contour of the ear hook along the user's vertical axis. An inclination (Continued)

angle of the long-axis direction relative to a horizontal direction is within a range of 13°-21°.

20 Claims, 17 Drawing Sheets

Related U.S. Application Data continuation of application No. PCT/CN2023/083542, filed on Mar. 24, 2023.

(30) Foreign Application Priority Data

Dec. 30, 2022 (WO) ................ PCT/CN2022/144339
Mar. 2, 2023 (WO) ................ PCT/CN2023/079409

(56) References Cited

U.S. PATENT DOCUMENTS

| | | | | |
|---|---|---|---|---|
| 2008/0181429 | A1* | 7/2008 | Fried | H04R 1/44 381/87 |
| 2009/0097690 | A1* | 4/2009 | Liu | H04R 1/1066 381/381 |
| 2010/0124349 | A1* | 5/2010 | Bass | H04R 1/10 381/379 |
| 2020/0196062 | A1 | 6/2020 | Zhang | |
| 2020/0322712 | A1 | 10/2020 | Williams et al. | |
| 2021/0168483 | A1* | 6/2021 | Zhang | H04R 1/1091 |
| 2021/0219068 | A1* | 7/2021 | Zhang | G10K 11/26 |
| 2022/0095029 | A1* | 3/2022 | Zheng | H04R 1/1091 |
| 2022/0369014 | A1* | 11/2022 | Wang | H04R 1/105 |
| 2022/0369021 | A1* | 11/2022 | Wang | H04R 1/105 |
| 2022/0377451 | A1* | 11/2022 | Shi | H04R 1/1075 |
| 2022/0400327 | A1* | 12/2022 | Wang | H04R 1/105 |
| 2023/0028541 | A1* | 1/2023 | Wang | H04R 1/105 |
| 2023/0063283 | A1* | 3/2023 | Zheng | H04R 1/1008 |
| 2023/0179907 | A1* | 6/2023 | Zhang | H04R 1/1066 381/381 |
| 2023/0412962 | A1* | 12/2023 | Parrin | H04R 1/1033 |

FOREIGN PATENT DOCUMENTS

| | | | |
|---|---|---|---|
| CN | 112218199 | A | 1/2021 |
| CN | 212909891 | U | 4/2021 |
| CN | 113542956 | A | 10/2021 |
| CN | 113556638 | A | 10/2021 |
| CN | 113573215 | A | 10/2021 |
| CN | 114286228 | A | 4/2022 |
| CN | 114286236 | A | 4/2022 |
| CN | 114554339 | A | 5/2022 |
| CN | 115175069 | A | 10/2022 |
| WO | 2022111485 | A1 | 6/2022 |

OTHER PUBLICATIONS

Written Opinion in PCT/CN2023/083542 mailed on Jul. 11, 2023, 9 pages.

* cited by examiner

EARPHONES

CROSS REFERENCE TO RELATED APPLICATIONS

This application is a continuation of U.S. patent application Ser. No. 18/501,012, filed on Nov. 2, 2023, which is a continuation of International Patent Application No. PCT/CN2023/083542, filed on Mar. 24, 2023, which claims priority to the Chinese Patent Application No. 202211336918.4 filed on Oct. 28, 2022, the Chinese Patent Application No. 202223239628.6 filed on Dec. 1, 2022, the International Patent Application PCT/CN2022/144339 filed on Dec. 30, 2022, and the International Patent Application PCT/CN2023/079409 filed on Mar. 2, 2023, the entire contents of each of which are hereby incorporated by reference.

TECHNICAL FIELD

The present disclosure relates to the field of acoustics, and in particular, to earphones.

BACKGROUND

With the development of acoustic output technology, acoustic devices (e.g., headphones) have been widely used in people's daily lives, and can be used in conjunction with electronic devices such as cell phones and computers to provide users with an auditory feast. Acoustic devices can generally be classified into a head-mounted type, an ear-hook type, and an in-ear type according to the ways the users wear them.

Therefore, it is necessary to provide an earphone that can improve the wearing comfort of users and have good output performance.

SUMMARY

Some embodiments of the present disclosure provide an earphone comprising a sound production component and an ear hook. The sound production component may include a transducer and a housing for accommodating the transducer. In a wearing state, a first portion of the ear hook may be hung between an auricle and a head of a user, a second portion of the ear hook may connect with the first portion of the ear hook. The second portion of the ear hook may extend towards a side of the auricle away from the head and connect to the sound production component to place the sound production component at a position near an ear canal but not blocking the ear canal. An inner contour of a projection of the ear hook on a user's sagittal plane may include a first curve, the first curve may have an extremum point in a first direction, and the first direction may be perpendicular to a long-axis direction of a projection of the sound production component on the user's sagittal plane. The extremum point may be located behind a projection point of an upper vertex of the ear hook on the user's sagittal plane, and the upper vertex may be a highest point of an inner contour of the ear hook along a vertical axis of the user in the wearing state. An inclination angle of the long-axis direction of the projection of the sound production component on the user's sagittal plane relative to a horizontal direction may be within a range of 13°-21°

In some embodiments, a distance between the extremum point and the projection point of the upper vertex of the ear hook on the user's sagittal plane may be within a range of 6 mm-15 mm along the long-axis direction of the projection of the sound production component.

In some embodiments, the distance between the extremum point and a projection point of a mass center of the sound production component on the user's sagittal plane may be within a range of 20 mm-30 mm.

In some embodiments, an included angle between a connection line connecting the extremum point and the projection point of the mass center of the sound production component on the user's sagittal plane, and the long-axis direction of the projection of the sound production component may be within a range of 65°-85°.

In some embodiments, the distancedistance between the projection point of the upper vertex on the user's sagittal plane and the projection point of the mass center of the sound production component on the user's sagittal plane may be within a range of 20 mm-30 mm.

In some embodiments, an included angle between a connection line connecting the projection point of the upper vertex on the user's sagittal plane and the projection point of the mass center of the sound production component on the user's sagittal plane, and the long-axis direction of the projection of the sound production component may be within a range of 45°-65°.

In some embodiments, the sound production component may extend at least partially into a cavum concha. A first distance may exist between the projection point of the mass center of the sound production component on the user's sagittal plane and the projection point of a highest point of the auricle on the user's sagittal plane in a vertical-axis direction. A ratio of the first distance to a height of a projection of the auricle on the user's sagittal plane in the vertical-axis direction may be within a range of 0.35-0.6. A second distance may exist between the projection point of the mass center of the sound production component on the user's sagittal plane and a projection point of an end point of the auricle on the user's sagittal plane in a sagittal-axis direction. A ratio of the second distance to a width of the projection of the auricle on the user's sagittal plane in the sagittal-axis direction may be within a range of 0.4-0.65.

In some embodiments, a distance between a projection point of a midpoint of an upper side surface of the sound production component on the user's sagittal plane and the projection point of the highest point of the auricle on the user's sagittal plane may be within a range of 24 mm-36 mm. A distance between a projection point of a midpoint of a lower side surface of the sound production component on the user's sagittal plane and the projection point of the highest point of the auricle on the user's sagittal plane may be within a range of 36 mm-54 mm.

In some embodiments, in the wearing state, a distance between the projection point of the midpoint of the upper side surface of the sound production component on the user's sagittal plane and the projection point of the upper vertex on the user's sagittal plane may be within a range of 21 mm-32 mm. A distance between the projection point of the midpoint of the lower side surface of the sound production component on the user's sagittal plane and the projection point of the upper vertex on the user's sagittal plane may be within a range of 32 mm-48 mm.

In some embodiments, a distance from a projection point of a free end of the sound production component on the user's sagittal plane to a projection of an edge of the cavum concha on the user's sagittal plane may be not greater than 13 mm.

In some embodiments, a distance from the projection point of the mass center of the sound production component on the user's sagittal plane to a contour of the projection of the auricle on the user's sagittal plane may be within a range of 23 mm-52 mm.

In some embodiments, a distance from the projection point of the mass center of the sound production component on the user's sagittal plane to a projection of the first portion of the ear hook on the user's sagittal plane may be within a range of 18 mm-43 mm.

In some embodiments, in a non-wearing state, a distance from a projection point of a mass center of the sound production component on a specific reference plane to a projection of the first portion of the ear hook on the specific reference plane may be within a range of 13 mm-38 mm.

In some embodiments, in a non-wearing state, an included angle between a connection line connecting a corresponding point of the extremum point on the ear hook and the mass center of the sound production component and an ear hook plane may be within a range of 10°-18°.

In some embodiments, in the non-wearing state, an included angle between an outer side surface or an inner side surface of the sound production component and the ear hook plane may be within a range of 15°-25°.

In some embodiments, in the non-wearing state, a distance from a point on the ear hook farthest from the inner side surface of the sound production component to the inner side surface of the sound production component may be within a range of 6 mm-9 mm.

In some embodiments, in the non-wearing state, a distance from a point on the sound production component farthest from the ear hook plane to the ear hook plane may be within a range of 11.2 mm-16.8 mm.

In some embodiments, a first derivative of the first curve in a first preset coordinate system may be continuous, a vertical axis of the first preset coordinate system may be parallel to the first direction, and a horizontal axis of the first preset coordinate system may be parallel to the long-axis direction of the projection of the sound production component.

In some embodiments, the first derivative of the first curve in the first preset coordinate system may have one or more inflection points.

In some embodiments, a count of the one or more inflection points may be one.

In some embodiments, both sides of each of the one or more inflection points may respectively have extremum points.

In some embodiments, a second derivative of the first curve in the first preset coordinate system may be continuous.

In some embodiments, the second derivative of the first curve in the first preset coordinate system may have a maximum point.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
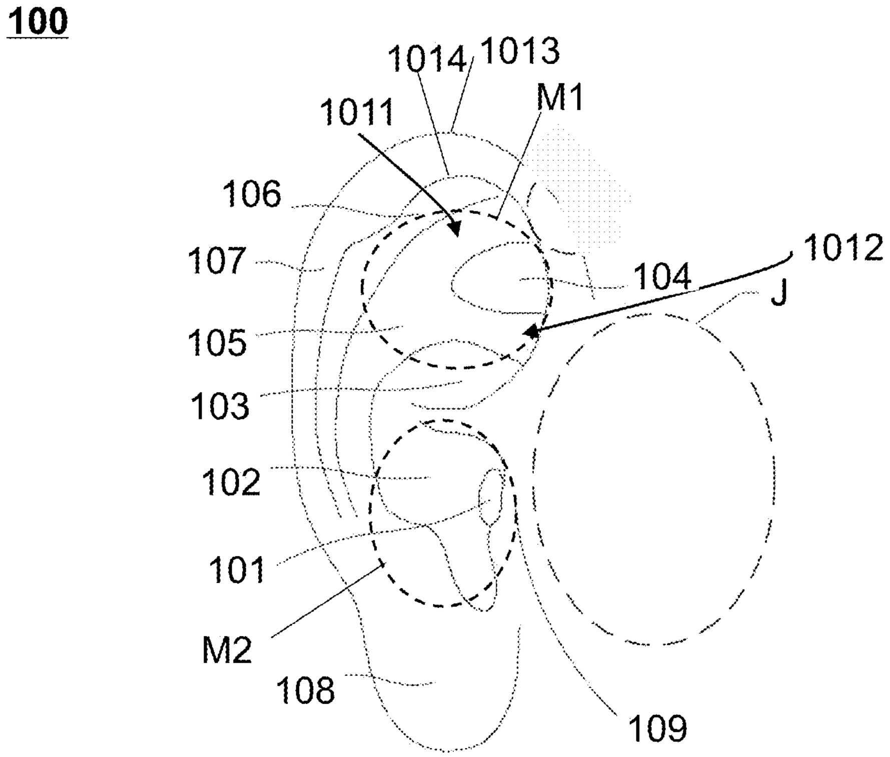
FIG. 1 is a schematic diagram illustrating an exemplary ear according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system," "device," "unit" and/or "module" as used herein is a manner used to distinguish different components, elements, parts, sections, or assemblies at different levels. However, if other words serve the same purpose, the words may be replaced by other expressions.

As shown in the present disclosure and the claims, unless the context clearly suggests exceptional circumstances, the words "a," "an," and/or "the" do not specifically refer to the singular, but may also include the plural In general, the terms "comprise," "comprises," "comprising," "include," "includes," and/or "including," merely prompt to include operations and elements that have been clearly identified, and these operations and elements do not constitute an exclusive listing.

FIG. 1 is a schematic diagram illustrating an exemplary ear according to some embodiments of the present disclosure. As shown in FIG. 1, an ear 100 may include an external ear canal 101, a cavum concha 102, a cymba concha 103, a triangular fossa 104, an antihelix 105, a scapha 106, a helix 107, an earlobe 108, a helix foot 109, an outer contour 1013, and an inner contour 1014. It should be noted that, for ease of description, in some embodiments of the present disclosure, a superior crus of antihelix 1011, an inferior crus of antihelix 1012, and the antihelix 105 are collectively referred to as an antihelix region. In some embodiments, one or more parts of the ear 100 may be used to support an acoustic device for stable wearing to achieve stable wearing of the acoustic device. In some embodiments, parts of the ear 100 such as the external ear canal 101, the cavum concha 102, the cymba concha 103, the triangular fossa 104, etc., have a certain depth and volume in the three-dimensional space, which may be used to meet wearing requirements of the acoustic device. For example, the acoustic device (e.g., an in-ear earphone) may be worn in the external ear canal 101. In some embodiments, the wearing of the acoustic device may be achieved with the aid of other parts of the ear 100 other than the external ear canal 101. For example, the wearing of the acoustic device may be achieved with the aid of the cymba concha 103, the triangular fossa 104, the antihelix 105, the scapha 106, the helix 107, or a combination thereof. In some embodiments, to improve the comfort and reliability of the acoustic device in wearing, parts such as a user's earlobe 108 may also be used. By utilizing parts of the ear 100 other than the external ear canal 101 for the wearing of the acoustic device and the transmission of sound, the user's external ear canal 101 may be "liberated." When the user wears the acoustic device (e.g., an earphone), the acoustic device does not block the external ear canal 101 of the user, and the user may receive both sounds from the acoustic device and sounds from the environment (e.g., horn sounds, car bells, surrounding voices, traffic commands, etc.), thereby reducing the probability of traffic accidents. In the present disclosure, the acoustic device that does not block the user's external ear canal 101 (or ear canal or ear canal opening) when worn by the user may be referred to as an earphone. In some embodiments, the acoustic device may be designed to adapt to the ear 100 according to the construction of the ear 100 to enable a sound production component of the acoustic device to be worn at various positions of the ear. For example, when the acoustic device is an earphone, the earphone may include an ear hook and a sound production component. The sound production component is physically connected to the ear hook. The ear hook may be matched to a shape of an auricle to place an entire or partial structure of the sound production component at a front side of the helix foot 109 (e.g., a region J enclosed by the dashed line in FIG. 1). As another example, when the user wears the earphone, the entire or partial structure of the sound production component may be in contact with an upper part of the external ear canal 101 (e.g., a location where one or more parts such as the helix foot 109, the cymba concha 103, the triangular fossa 104, the antihelix 105, the scapha 106, or the helix 107, etc., are located). As yet another example, when the user wears the earphone, the entire or partial structure of the sound production component may be located in a cavity (e.g., the region M1 enclosed by the dashed line in FIG. 1 containing at least the cymba concha 103 and the triangular fossa 104 and the region M2 containing at least the cavum concha 102) formed by one or more parts (e.g., the cavum concha 102, the cymba concha 103, the triangular fossa 104, etc.) of the ear 100.

Different users may have individual differences, resulting in different shapes, dimensions, etc., of ears. For ease of description and understanding, unless otherwise specified, the present disclosure primarily uses an ear model with a "standard" shape and dimension as a reference and further describes the wearing manners of the acoustic device in different embodiments on the ear model. For example, a simulator (e.g., GRAS KEMAR, HEAD Acoustics, B&K 4128 series, or B&K 5128 series) with a head and (left and right) ears, produced based on standards such as ANSI: S3.36, S3.25, and IEC: 60318-7, may be used as a reference for wearing the acoustic devices to present a scenario in which most users wear the acoustic device normally. Taking GRAS KEMAR as an example, the simulator of the ear may be any one of GRAS 45AC, GRAS 45BC, GRAS 45CC, GRAS 43AG, etc. Taking HEAD Acoustics as another example, the simulator of the ear may be any one of HMS II.3, HMS II.3 LN, HMS II.3LN HEC, etc. It should be noted that a data range obtained in the embodiments of the present disclosure is obtained based on GRAS 45BC KEMAR, but it should be understood that there may be differences between different head and ear models, and ranges of relevant data may fluctuate within +10% when using other models. Merely by way of example, an ear model used for reference may have the following relevant features: a projection of the auricle on a sagittal plane may have a dimension in a range of 55 mm to 65 mm in a vertical-axis direction, and a projection of the auricle on the sagittal plane may have a dimension in a range of 45 mm to 55 mm in a sagittal axis direction. The projection of the auricle on the sagittal plane refers to a projection of an edge of the auricle on the sagittal plane. The edge of the auricular is composed of at least an outer contour of the helix, a contour of the earlobe, a contour of the tragus, an intertragic notch, an antitragic apex, an antihelix-antitragus notch, etc. Thus, in the present disclosure, the descriptions such as "worn by the user," "in the wearing state," and "under the wearing state" may refer to the acoustic device described in the present disclosure being worn on the ear of the aforementioned simulator. Of course, considering that different users have individual differences, the structure, shape, dimension, thickness, etc., of one or more parts of the ear 100 may be somewhat different. In order to meet the needs of different users, the acoustic device may be designed differently, and these differential designs may be manifested as feature parameters of one or more parts of the acoustic device (e.g., a sound production component, an ear hook, etc., in the following descriptions) having different ranges of values, thus adapting to different ears.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane may refer to a section perpendicular to the ground along a front and rear direction of the body, which divides the human body into left and right parts. The coronal plane may refer to a section perpendicular to the ground along a left and right direction of the body, which divides the human body into front and rear parts. The horizontal plane may refer to a section parallel to the ground along an up-and-down direction of the body, which divides the human body into upper and lower parts. Correspondingly, the sagittal axis may refer to an axis along the front-and-rear direction of the body and perpendicular to the coronal plane. The coronal axis may refer to an axis along the left-and-right direction of the body and perpendicular to the sagittal plane. The vertical axis may refer to an axis along the up-and-down direction of the body and perpendicular to the horizontal plane. Further, the “front side of the ear” as described in the present disclosure refers to a side facing a facial region of the human body in a direction along the coronal axis of the human body. In this case, observing the ear of the above simulator in a direction along the coronal axis of the human body, a schematic diagram illustrating the front side of the ear as shown in FIG. 1 is obtained.

The description of the ear 100 above is provided for illustrative purposes and is not intended to limit the scope of the present disclosure. Those skilled in the art may make various changes and modifications based on the description of the present disclosure. For example, certain structures of the acoustic device may shield a portion or all of the external ear canal 101. These changes and modifications are still within the scope of protection of the present disclosure.

Figure 2:
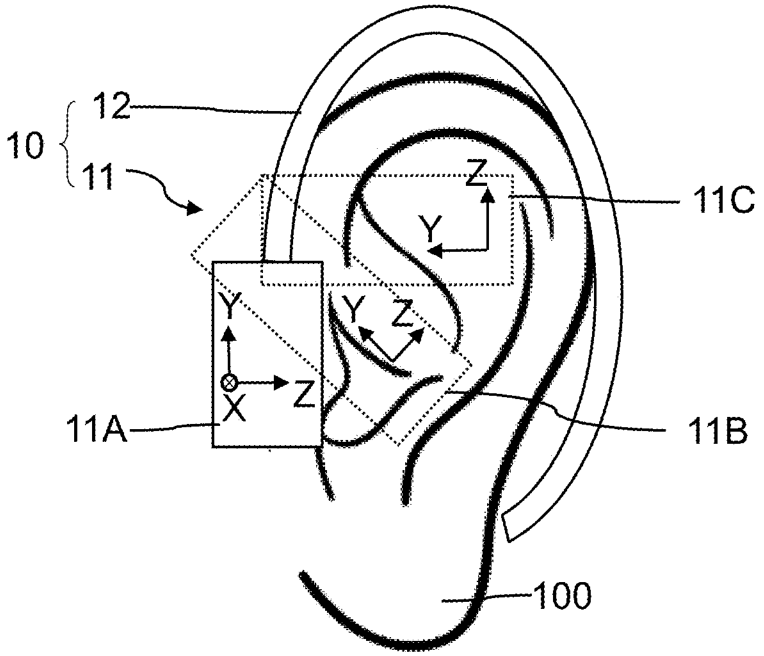
FIG. 2 is a schematic diagram illustrating an exemplary wearing state of an earphone according to some embodiments of the present disclosure.

FIG. 2 is a schematic diagram illustrating an exemplary wearing state of an earphone according to some embodiments of the present disclosure. As shown in FIG. 2, an earphone 10 may include a sound production component 11 and an ear hook 12. In some embodiments, the earphone 10 may enable the sound production component 11 to be worn on a user’s body (e.g., the head, the neck, or the upper torso of the body) through the ear hook 12, and at the same time, a housing and a transducer of the sound production component 11 may be close to, but not blocking an ear canal, allowing the ear 100 of the user to be kept open. Therefore, the user may receive not only a sound output from the earphone 10 but also a sound from an external environment. For example, the earphone 10 may be arranged around or partially around the ear 100 of the user and may propagate a sound in an air conduction or bone conduction manner.

In some embodiments, the housing may be worn on the user’s body and carry the transducer. In some embodiments, the housing may be a closed housing structure with a hollow interior, and the transducer is located inside the housing. In some embodiments, the earphone 10 may be combined with products such as glasses, a headset, a head-mounted display device, an AR/VR headset, etc. In such cases, the housing may be placed near the ear 100 of the user in a hanging or clamping manner. In some alternative embodiments, a suspension structure (e.g., a hook) may be provided on the housing. For example, the shape of the hook matches the shape of an auricle, and the earphone 10 may be independently worn on the ear 100 of the user through the hook.

In some embodiments, the housing may be a housing structure having a shape suitable for the ear 100, for example, circular, elliptical, polygonal (which is regular or irregular), U-shaped, V-shaped, semicircular, etc., so that the housing may be directly hung on the ear 100 of the user. In some embodiments, the housing may also include a fixed structure. The fixed structure may include an ear hook, an elastic band, etc., so that the earphone 10 may be better worn on the user’s body to prevent falling during using.

In some embodiments, when the user wears the earphone 10, the sound production component 11 may be located on an upper side, a lower side, or a front side (e.g., a region J on a front side of a tragus shown in FIG. 1) of the ear 100 of the user, or inside the auricle (e.g., a region M where a cavum concha is located). Two or more acoustic holes (such as a sound outlet and a pressure relief hole) for propagating sound may also be set on the sound production component 11. In some embodiments, the transducer in the sound production component 11 may output sounds with a phase difference (e.g., phase opposite) through the two or more acoustic holes.

In some embodiments, the transducer may include a vibration diaphragm. When the vibration diaphragm vibrates, sounds may be emitted from a front side and a rear side of the vibration diaphragm. In some embodiments, a front cavity (not shown) for sound transmission is set at the front side of the vibration diaphragm in the housing. The front cavity is acoustically coupled with an acoustic hole (such as the sound outlet), and the sound at the front side of the vibration diaphragm may be emitted from the sound outlet through the front cavity. A rear cavity (not shown) for sound transmission is set at the rear side of the vibration diaphragm in the housing. The rear side is acoustically coupled with another acoustic hole (such as the pressure relief hole), and the sound at the rear side of the vibration diaphragm may be emitted from the pressure relief hole through the rear cavity. It needs to be understood that when the vibration diaphragm is vibrating, the front side and the rear side of the vibration diaphragm may simultaneously produce a set of sounds with a phase difference (e.g., phase opposite). When the sound passes through the front cavity and the rear cavity respectively, the sound may propagate outward from the sound outlet acoustically coupled with the front cavity and the pressure relief hole acoustically coupled with the rear cavity. In some embodiments, by setting structures of the front cavity and the rear cavity, the sounds output by the transducer at the sound outlet and the pressure relief hole may satisfy a specific condition. For example, lengths of the front cavity and the rear cavity may be set so that a set of sounds with a specific phase relationship (e.g., phase opposite) may be output from the sound outlet and the pressure relief hole. In some embodiments, the sound outlet may be located on an inner wall (e.g., an inner side surface IS) of the housing of the sound production component 11 toward the external ear canal 101 of the user, and the pressure relief hole may be located on a side (e.g., an outer side surface OS) of the housing of the sound production component 11 away from the external ear canal 101 of the user.

Referring to FIG. 1 and FIGS. 2, 11A, 11B, and 11C in FIG. 2 represent schematic diagrams of different positions of the sound production component 11 in a wearing state, respectively. In some embodiments, when the user wears the earphone 10, at least a portion of the sound production component 11 may be located in a region J at a front side of the tragus of the user’s ear 100 or in regions $M_1$ and $M_2$ at a front outer side of the auricle, as shown in FIG. 1. The following may provide illustrative explanations in the context of different wearing positions (11A, 11B, and 11C) of the sound production component 11. It should be noted that in the embodiments of the present disclosure, the front outer side of the auricle refers to a side of the auricle that deviates from the head along a direction of a coronal axis. Correspondingly, a rear inner side of the auricle refers to a side of the auricle that faces towards the head in a direction of the coronal axis. In some embodiments, the sound production component 11A is located at a side of the user's ear 100 towards the facial region of the human body in the sagittal axis direction, i.e., the sound production component 11A is located in the region J of the facial region of the human body on the front side of the ear 100. Further, the housing of the sound production component 11A is internally equipped with a transducer, and the housing of the sound production component 11A may be equipped with at least one sound outlet (not shown in FIG. 2). The sound outlet may be located on a side wall (e.g., an inner side surface IS as described later) of the housing of the sound production component 11 that faces or near the user's external ear canal 101, and the transducer may output sound through the sound outlet to the user at the external ear canal 101. In some embodiments, the sound production component 11 may have a long-axis direction Y and a short-axis direction Z that are orthogonal to each other and perpendicular to a thickness direction X. The long-axis direction Y may be defined as a direction (e.g., when a projection shape is a rectangle or an approximate rectangle, the long-axis direction may be a direction of a length of the rectangle or the approximate rectangle) having a maximum extension dimension in a shape of a two-dimensional projection plane (e.g., a projection of the sound production component 11 on a plane where an outer side surface of the sound production component 11 is located, or a projection of the sound production component 11 on the sagittal plane) of the sound production component 11, and the short-axis direction Z may be defined as a direction (e.g., when a projection shape is a rectangle or an approximate rectangle, the short-axis direction is a direction of a width of the rectangle or approximate rectangle) that is perpendicular to the long-axis direction Y in the shape of the projection of the sound production component 11 on the sagittal plane. The thickness direction X may be defined as a direction perpendicular to the two-dimensional projection plane, for example, which is consistent with a direction of the coronal axis, both pointing to the left and right directions of the human body. In some embodiments, in the wearing state, when the sound production component 11 is in an inclined state, the long-axis direction Y and the short-axis direction Z are still parallel or approximately parallel to the sagittal plane. The long-axis direction Y may have a certain included angle with the sagittal axis, i.e., the long-axis direction Y is inclined accordingly. The short-axis direction Z may have a certain included angle with the vertical axis, i.e., the short-axis direction Z is inclined accordingly, for example, the inclined state of the sound production component 11B as shown in FIG. 2, the inclined state of the sound production component 11 as shown in FIG. 3, the vertical state of the sound production component 11A as shown in FIG. 2.

Figure 3:
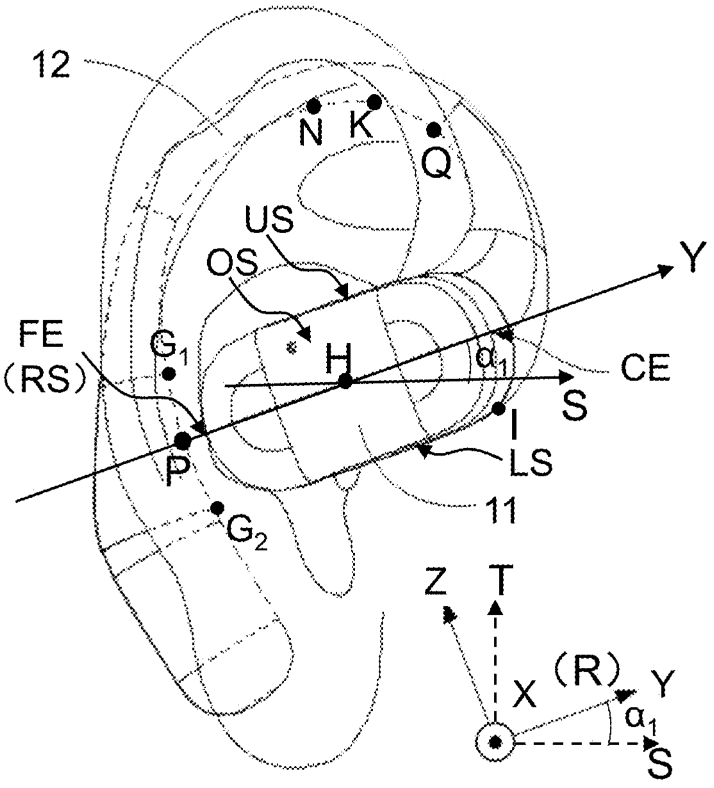
FIG. 3 is a schematic diagram illustrating an exemplary wearing state of an earphone according to some embodiments of the present disclosure.

FIG. 3 is a schematic diagram illustrating an exemplary wearing state of an earphone according to some embodiments of the present disclosure. In some embodiments, referring to FIG. 3 and FIG. 11A, the sound production component 11 may have an inner side surface IS facing toward the ear and an outer side surface OS away from the ear along the thickness direction X in a wearing state, and a connection surface connecting the inner side surface IS and outer side surface OS. It should be noted that in the wearing state, when viewed along a direction in which the coronal axis is located (i.e., in the thickness direction X), the sound production component 11 may be set in a shape of a circle, an ellipse, a rounded square, a rounded rectangle, or the like. When the sound production component 11 is set in the shape of the circle, the ellipse, etc., the above-mentioned connection surface may refer to an arc-shaped side surface of the sound production component 11; and when the sound production component 11 is set in the shape of the rounded square, the rounded rectangle, etc., the above-mentioned connection surface may include a lower side surface LS, an upper side surface US, and a rear side surface RS as mentioned later. Thus, for the sake of description, this embodiment is exemplarily illustrated with the sound production component 11 set in the rounded rectangle. The length of the sound production component 11 in the long-axis direction Y may be greater than the width of the sound production component 11 in the short-axis direction Z. As shown in FIG. 3, the sound production component 11 may have an upper side surface US facing away from the external ear canal 101 along the short-axis direction Z, a lower side surface LS facing the external ear canal 101 in the wearing state, and a rear side surface RS connecting the upper side surface US and the lower side surface LS. The rear side surface RS may be located at a side of the long-axis direction Y towards the back of the head in the wearing state and may be at least partially located in the cavum concha 102.

In some embodiments, the entire or partial structure of the sound production component 11B may extend into the cavum concha, in other words, the projection of the sound production component 11B on the sagittal plane has an overlapped portion with the projection of the cavum concha on the sagittal plane. Specific details about the sound production component 11B may be found elsewhere in the present disclosure, such as FIG. 3 and the corresponding description. In some embodiments, in the wearing state, the sound production component 11 may also be in a horizontal state or an approximately horizontal state, as shown by the sound production component 11C in FIG. 2. The long-axis direction Y may be consistent with or approximately consistent with the sagittal axis, both pointing to the anterior-posterior direction of the human body, and the short-axis direction Z may be consistent with or approximately consistent with the vertical axis, both pointing to the up-down direction of the human body. It should be noted that in the wearing state, the sound production component 11C being in an approximately horizontal state may mean that the included angle between the long-axis direction Y of the sound production component 11C and the sagittal axis falls within a specific range (e.g., not greater than 20°). Furthermore, the wearing position of the sound production component 11 is not limited to the sound production component 11A, the sound production component 11B, and the sound production component 11C as shown in FIG. 2. The sound production component 11 may be located in any position as long as it is in the regions J, $M_1$, or $M_2$ as shown in FIG. 1. For example, the entire or partial structure of the sound production component 11 may be located within the region J enclosed by the dashed lines in FIG. 1. As another example, the entire or partial structure of sound production component 11 may be in contact with one or more positions of the ear 100, such as the helix foot 109, the cymba concha 103, the triangular fossa 104, the antihelix 105, the scapha 106, or the helix 107. As yet another example, the entire or partial structure of the sound production component 11 may be located within cavities (e.g., the region M1 enclosed by the dashed line in FIG. 1 containing at least the cymba concha 103 and the triangular fossa 104 and the region M2 containing at least the cavum concha 102) formed by one or more parts (e.g., the cavum concha 102, the cymba concha 103, the triangular fossa 104, etc.) of the ear 100.

Figure 4:
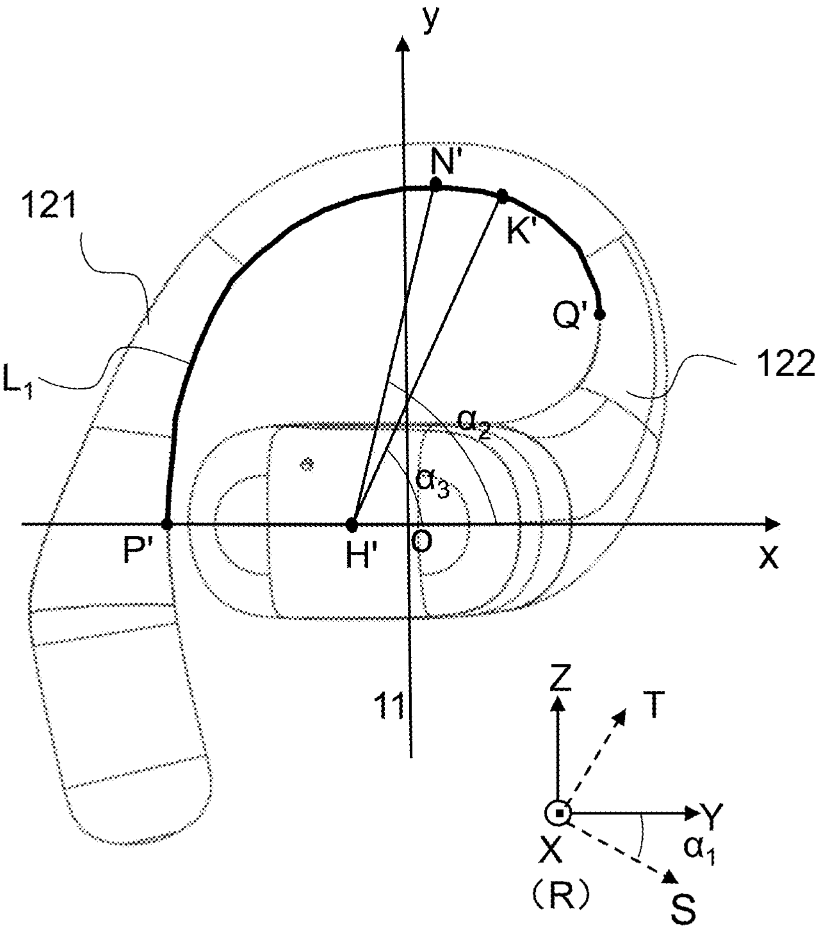
FIG. 4 is a schematic diagram illustrating an exemplary projection of an earphone on a user's sagittal plane according to some embodiments of the present disclosure.

FIG. 4 is a schematic diagram illustrating an exemplary projection of an earphone on a user's sagittal plane according to some embodiments of the present disclosure. Referring to FIG. 4, in some embodiments, in a wearing state, a first portion 121 of the ear hook 12 may be hung between an auricle and a head of a user, and a second portion 122 may extend to a side of the auricle away from the head and connects to the sound production component 11, so that the sound production component 11 may be placed near an ear canal but not blocking an ear canal opening.

In some embodiments, the first portion 121 of the ear hook 12 may include a battery compartment 13. A battery connected to the sound production component 11 may be arranged in the battery compartment 13. In some embodiments, the battery compartment 13 may be located at an end of the first portion 121 away from the sound production component 11, and a projection contour of an end of the ear hook 12 away from the sound production component 11 may be a projection contour of a free end of the battery compartment 13 on the user's sagittal plane. In some embodiments, when the user wears the earphone 10, the sound production component 11 and the battery compartment 13 may be located respectively on a front side and a rear side of the auricle.

In order to improve the stability of the earphone 10 in the wearing state, the earphone 10 may adopt any one or a combination of the following configurations. First, at least part of the ear hook 12 may be configured as a profiling structure that fits at least one of the rear inner side of the auricle and the head, to increase a contact area between the ear hook 12 and the ear and/or the head, thereby increasing the resistance of the acoustic device 10 falling off from the ear. Second, at least part of the ear hook 12 may be configured as an elastic structure, so that the ear hook 12 may have a certain amount of deformation in the wearing state, to increase the positive pressure of the ear hook 12 on the ear and/or the head, thereby increasing the resistance of the earphone 10 falling off from the ear. Third, at least part of the ear hook 12 may be configured to abut against the ear and/or the head in the wearing state, to form a counteracting force that presses against the ear and makes the sound production component 11 press against the front outer side (e.g., the regions M1 and M2 shown in FIG. 1) of the auricle, thereby increasing the resistance of the earphone 10 falling off from the ear. Fourth, the sound production component 11 and the ear hook 12 may be configured to clamp the antihelix region, the cavum concha region, etc., from the front outer side and the rear inner side of the auricle in the wearing state, thereby increasing the resistance of the earphone 10 falling off from the ear. Fifth, the sound production component 11 or a structure connected thereto may be configured to at least partially extend into cavities such as the cavum concha 102, the cymba concha 103, the triangular fossa 104, and the scapha 106, thereby increasing the resistance of the earphone 10 falling off from the ear.

As shown in FIG. 3, in some embodiments, the sound production component 11 has a fixed end CE connected to the ear hook 12 and a free end FE not connected to the ear hook 12. For example, referring to FIG. 3, the free end FE of the sound production component 11 may extend into the cavum concha in the wearing state. The sound production component 11 and the ear hook 12 may be arranged to clamp an ear region mentioned above from a front side and a rear side of the ear region corresponding to the cavum concha, thereby increasing the falling resistance of the earphone 10 from the ear, and further improving the reliability of the earphone 10 in the wearing state. For example, the free end FE is pressed in the cavum concha in the thickness direction X. As another example, the free end FE may abut against the cavum concha in the long-axis direction Y and the short-axis direction Z (e.g., abutting against an inner wall of the cavum concha corresponding to the free end FE). It should be noted that the sound production component 11 may be a regular or an irregular structure, and for illustrative purposes, the present disclosure provides some examples to further illustrate the free end FE of the sound production component 11. For example, when the sound production component 11 is a cuboid structure, an end wall surface of the sound production component 11 is a plane, and in this case, the free end FE of the sound production component 11 refers to an end side wall (e.g., the rear side surface RS as shown in FIG. 3) opposite to the fixed end CE of the sound production component 11 that is connected to the ear hook 12. As another example, when the sound production component 11 is a sphere, an ellipsoid, or an irregular structure, the free end FE of the sound production component 11 may refer to a specific region away from the fixed end CE obtained by cutting the sound production component 11 along an X-Z plane (a plane formed by the short-axis direction Z and the thickness direction X). A ratio of a dimension of the specific region along the long-axis direction Y to a dimension of the sound production component 11 along the long-axis direction Y may be in a range of 0.05-0.2.

It should be noted that in the wearing state, the free end FE of the sound production component 11 may not only be inserted into the cavum concha, but also be projected orthogonally onto the antihelix, and may also be projected orthogonally onto the left side or the right side of the head and be located at a front side of the ear along the sagittal axis of the human body. In other words, the ear hook 12 may support the sound production component 11 to be worn to wearing positions such as the cavum concha, the antihelix, the front side of the ear, etc.

The following takes the earphone 10 shown in FIG. 3 as an example to describe the earphone 10 in detail. It should be known that, without violating a corresponding acoustic principle, the structure and corresponding parameters of the earphone 10 in FIG. 3 may also be applicable to earphones of other structures mentioned above.

By extending at least part of the sound production component 11 into the cavum concha 102, a listening volume of sound at a listening position (e.g., at the ear canal opening) may be increased especially for mid-low frequency sounds, while still maintaining the good effect of far-field sound leakage cancellation. Merely by way of example, when the entire or partial structure of the sound production component 11 extends into the cavum concha 102, the sound production component 11 and the cavum concha 102 form a structure similar to a cavity (hereinafter referred to as a cavity-like structure). In the embodiments of the present disclosure, the cavity-like structure may be understood as a semi-enclosed structure enclosed by the side wall of the sound production component 11 and the cavum concha 102. The semi-closed structure may ensure that an inner environment is not completely closed and isolated from an outer environment, but has a leaking structure (e.g., an opening, a gap, a pipeline, etc.) acoustically communicating with the outer environment. When the user wears the earphone 10, one or more sound outlets may be provided on a side of the housing of the sound production component 11 proximate to or toward the user's ear canal, and one or more pressure relief holes may be provided on other side walls (e.g., the outer side surface OS that is away from or back away from the user's ear canal) of the housing of the sound production component 11. The one or more sound outlets may be acoustically coupled to a front cavity of the earphone 10, and the one or more pressure relief holes may be acoustically coupled to a rear cavity of the earphone 10. Taking the sound production component 11 including one sound outlet and one pressure relief hole as an example, a sound outputted from the sound outlet and a sound outputted from the pressure relief hole may be approximately regarded as two sound sources. Phases of the sounds of the two sound sources are opposite or approximately opposite. The sound production component 11 and the inner wall corresponding to the cavum concha 102 may form a cavity-like structure. A sound source corresponding to the sound outlet is located in the cavity-like structure, and a sound source corresponding to the pressure relief hole is located outside the cavity-like structure to form an acoustic model shown in FIG. 5.

Figure 5:
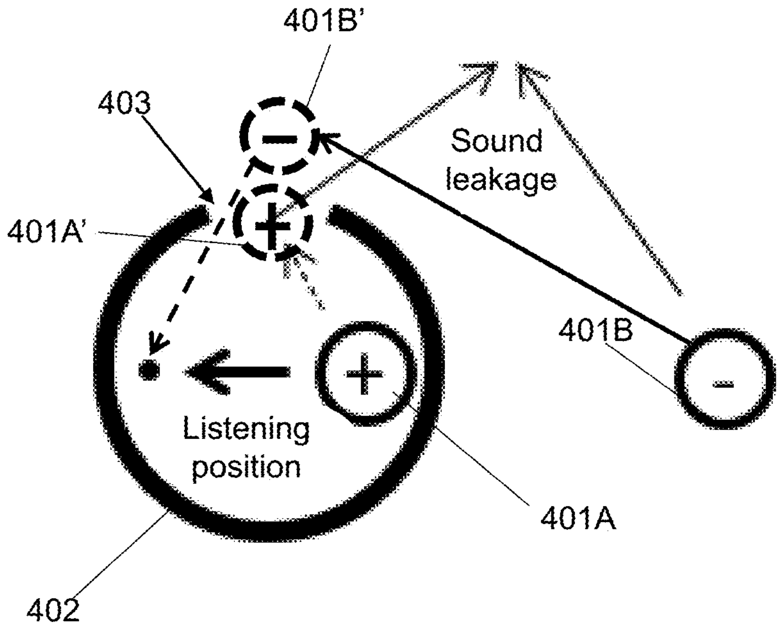
FIG. 5 is a distribution schematic diagram illustrating a cavity structure arranged around one of two sound sources according to some embodiments of the present disclosure.

FIG. 5 is a distribution schematic diagram illustrating a cavity structure arranged around one of two sound sources according to some embodiments of the present disclosure. As shown in FIG. 5, the cavity-like structure 402 may include a listening position and at least one sound source 401A. The "include" here may indicate that at least one of the listening position or the sound source 401A is located inside the cavity-like structure 402, or it may indicate that at least one of the listening position or the sound source 401A is located at an inner edge of the cavity-like structure 402. The listening position may be equivalent to the ear canal opening, an acoustic reference point in the ear such as an ear reference point (ERP) or an eardrum reference point (DRP), etc., or an entrance structure guiding to a listener, etc. The sound source 401B is located outside the cavity-like structure 402, and the sound sources 401A and 401B, with opposite phases, form a dipole. The dipole radiates sound into a surrounding space, and the sound may produce the phenomenon of interference and cancellation of sound waves, thereby achieving a leakage sound cancellation effect. Due to a relatively large sound path difference between the two sounds at the listening position, the leakage sound cancellation effect is not significant, allowing the listener to hear louder sound at the listening position compared to other positions. Specifically, since the sound source 401A is enclosed by the cavity-like structure 402, most of the sound radiated from the sound source 401A reaches the listening position through direct or reflected paths. In contrast, without the cavity-like structure 402, most of the sound radiated by sound source 401A does not reach the listening position. Therefore, the arrangement of the cavity-like structure 402 significantly increases a volume of the sound reaching the listening position. At the same time, only a small part of the anti-phase sound radiated from the anti-phase sound source 401B outside the cavity-like structure 402 enters the cavity-like structure 402 through a leaking structure 403 of the cavity-like structure 402. This is equivalent to generating a secondary sound source 401B' at the leaking structure 403. An intensity of the secondary sound source 401B' is significantly lower than an intensity of the sound source 401B and also significantly lower than an intensity of the sound source 401A. The sound produced by the secondary sound source 401B' weakly interferes with the sound source 401A inside the cavity, significantly increasing the listening volume at the listening position. Regarding the leakage sounds, the sound source 401A radiates sound to the outside world through the leaking structure 403 of the cavity-like structure 402, which is equivalent to generating a secondary sound source 401A' at the leaking structure 403. Since nearly all sounds radiated by the sound source 401A exit through the leaking structure 403, and a scale of the cavity-like structure 402 is significantly smaller than a spatial scale for evaluating the leakage sounds (differing by at least one order of magnitude), it may be considered that an intensity of the secondary sound source 401A' is equivalent to the intensity of the sound source 401A. For the external space, the secondary sound source 401A' and the sound source 401B may form a dual-point sound source, so that sounds produced by them cancel each other out, thereby reducing sound leakage. That is, a considerable sound leakage reduction effect may still be maintained under the cavity-like structure.

In specific application scenarios, an outer wall surface of the sound production component 11 is typically a planar or curved plane, while a contour of the user's cavum concha 102 is an uneven structure. By partially or entirely extending the sound production component 11 into the cavum concha 102, the sound production component 11 and the contour of the cavum concha 102 may form a cavity-like structure that communicates with the outside world. Furthermore, by placing the sound outlet at a position on an edge of the sound production component 11 facing the user's ear canal opening and close to the cavum concha 102 (e.g., the inner side surface IS), and placing the one or more pressure relief holes at a position on the sound production component 11 back away from or further away from the ear canal opening, the acoustic model as shown in FIG. 5 is formed, so as to increase the listening volume at the ear canal opening when wearing the earphone 10 and reduce the far-field sound leakage.

In order to understand and describe the shape of the earphone 10 in a non-wearing state or in a wearing state, the earphone 10 may be projected onto a specific plane, and the earphone 10 may be described by parameters related to a projection shape on the plane. Merely by way of example, in the wearing state, the earphone 10 may be projected on the sagittal plane of the human body to form a corresponding projection shape. In the non-wearing state, with reference to a relative positional relationship between the sagittal plane of the human body and the earphone 10, a first plane similar to this may be selected, so that a projection shape formed by the earphone 10 projected on the first plane is close to a projection shape of the earphone 10 on the sagittal plane of the human body. The first plane may be determined in the following manner: the ear hook 12 may be placed on a flat support plane (such as a horizontal desktop, a ground plane, etc.), and when the ear hook 12 is in contact with the support plane and placed stably, the support plane is the first plane corresponds to the earphone 10. Certainly, in order to maintain the uniformity of the specific plane corresponding to the wearing state and the non-wearing state, the first plane may also be the sagittal plane of the human body. In some embodiments, the first plane also refers to a plane formed by a bisection line that bisects or approximately bisects the ear hook 12 along a direction in which the ear hook 12 extends its length.

Referring to FIG. 4, in some embodiments, a first curve L1 in a projection of the ear hook 12 on the user's sagittal plane may be used as a reference curve of the ear hook 12. In some embodiments, since the earphone 10 is in the wearing state, a region where the ear hook 12 is in contact with an ear of a user is mainly an inner contour of the ear hook 12, so that the first curve L1 may be a reference curve corresponding to an inner contour of the projection of the ear hook 12 on the user's sagittal plane. In some embodiments, the inner side surface IS and/or the outer side surface OS of the sound production component 11 may be parallel to the user's sagittal plane, and the long-axis direction Y of the sound production component 11 may be the long-axis direction Y of a projection of the sound production component 11 on the user's sagittal plane. The short-axis direction Z of the sound production component 11 may be the short-axis direction Z of the projection of the sound production component 11 on the user's sagittal plane. In some embodiments, in the long-axis direction Y of the projection of the sound production component 11, a curve corresponds to the inner contour of the projection of the ear hook 12 on the user's sagittal plane has a leftmost end (point P') and a rightmost end (point Q'). An actual corresponding position of the point P' on the ear hook 12 is the point P, and the actual corresponding position of the point Q' on the ear hook 12 is the point Q, as shown in FIG. 3.

Referring to FIG. 4, in some embodiments, to establish a first rectangular coordinate system xoy, the long-axis direction Y of the projection of the sound production component 11 on the sagittal plane may be designated as an x-axis, a direction perpendicular to the x-axis is a y-axis, and an intersection of the x-axis and the y-axis may be designated as an origin o. The first curve L1 may be regarded as a curve in the first rectangular coordinate system xoy.

In some embodiments, the y-axis direction may be referred to as a first direction, that is, the first direction is perpendicular to the long-axis direction Y of the projection of the sound production component 11 on the user's sagittal plane, and faces a direction of a top of a head of the user. In some embodiments, in the first rectangular coordinate system xoy, the first curve L1 has an extremum point N' in the first direction. A positional relationship among the extremum point N', the ear hook 12, and other position points on the sound production component 11 may be set to adjust a wearing condition (e.g., a mechanical parameter when wearing and a position of the sound production component 11 relative to the ear when wearing) of the earphone 10. As shown in FIG. 3, and FIG. 4, in some embodiments, the extremum point N' is located on a rear side of an upper vertex K (which is represented by a projection point K' of the upper vertex K on the user's sagittal plane) on the ear hook 12. That is, on the projection of the ear hook 12 on the user's sagittal plane, compared with the projection point K' of the upper vertex K, the position of the extremum point N' is closer to the back of the head of the user. The specific process of determining the extremum point N' may be found in FIG. 15-FIG. 17 and related descriptions thereof, and may not be repeated herein.

In some embodiments, as shown in FIG. 3, the upper vertex K of the ear hook 12 may be a highest point of the inner contour of the ear hook 12 along a vertical axis of the user in the wearing state. In some embodiments, when the user wears the earphone 10, the ear 100 may support the earphone 10 mainly through the upper vertex K of the ear hook 12. In some embodiments, as shown in FIG. 3 and FIG. 4, the upper vertex K of the ear hook 12 may be a position where the inner contour of the ear hook 12 with the largest bending degree in the wearing state. In some embodiments, as shown in FIG. 3 and FIG. 4, in the wearing state, the upper vertex K of the ear hook 12 may be a point on the inner contour of the ear hook 12 which is farthest from an end of the ear hook 12 (i.e., an end of the first portion 121, a free end of the battery compartment 13, and an end of the ear hook 12 that is not in contact with the sound production component 11). In some embodiments, a position of the upper vertex K of the ear hook 12 may simultaneously satisfy one or more of the three positions mentioned above.

In some embodiments, as shown in FIG. 3, a corresponding point of the extremum point N' on the ear hook 12 is point N (also referred to as an ear hook extremum point N). In some embodiments, an included angle between an ear hook plane of the ear hook 12 (i.e., an ear hook plane S1 shown in FIG. 11A and FIG. 11B) and the user's sagittal plane may be considered comprehensively to determine the corresponding point N of the extremum point N' on the ear hook 12.

In some embodiments, by arranging the extremum point N' of the first curve L1 to be located at the rear side of the projection point K' of the upper vertex K of the ear hook 12 on the user's sagittal plane, it is possible to make the long-axis direction Y of the projection of the sound production component 11 in the wearing state be set at an included angle with a horizontal direction, and the sound production component 11 may be provided inclined downwardly in a direction from the fixed end CE to the free end FE of the sound production component 11, as shown in FIG. 3.

By arranging the sound production component 11 obliquely, at least a part of the sound production component 11 may extend into the cavum concha of the user, thereby forming the acoustic model shown in FIG. 5. The outer wall surface of the housing of the sound production component 11 may usually be a plane or a curved surface, and the contour of the cavum concha of the user may be an uneven structure. When the part of whole structure of the sound production component 11 extends into the cavum concha, a gap may be formed due to the sound production component 11 cannot be closely fit with the cavum concha. The gap may correspond to the leaking structure 403 in FIG. 5.

Figure 6:
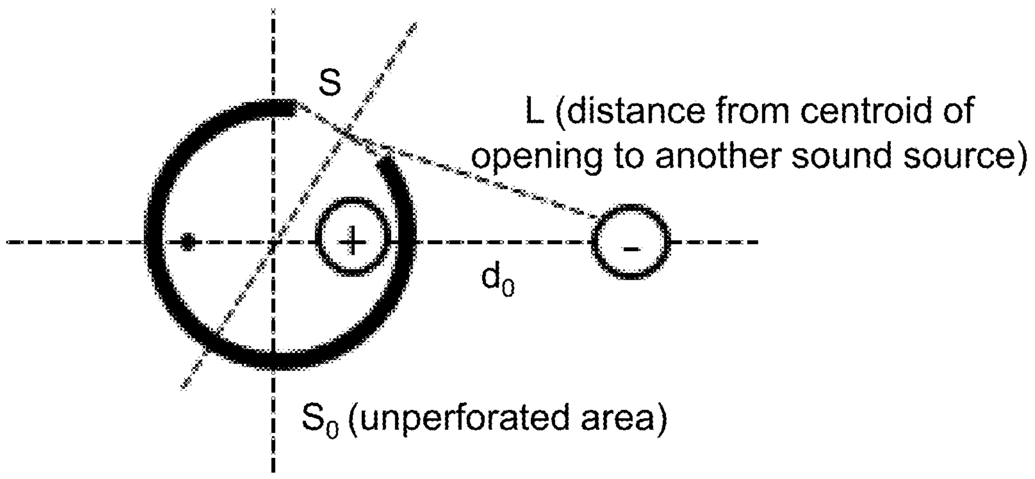
FIG. 6 is a schematic diagram illustrating a cavity-like structure according to some embodiments of the present disclosure.
Figure 7:
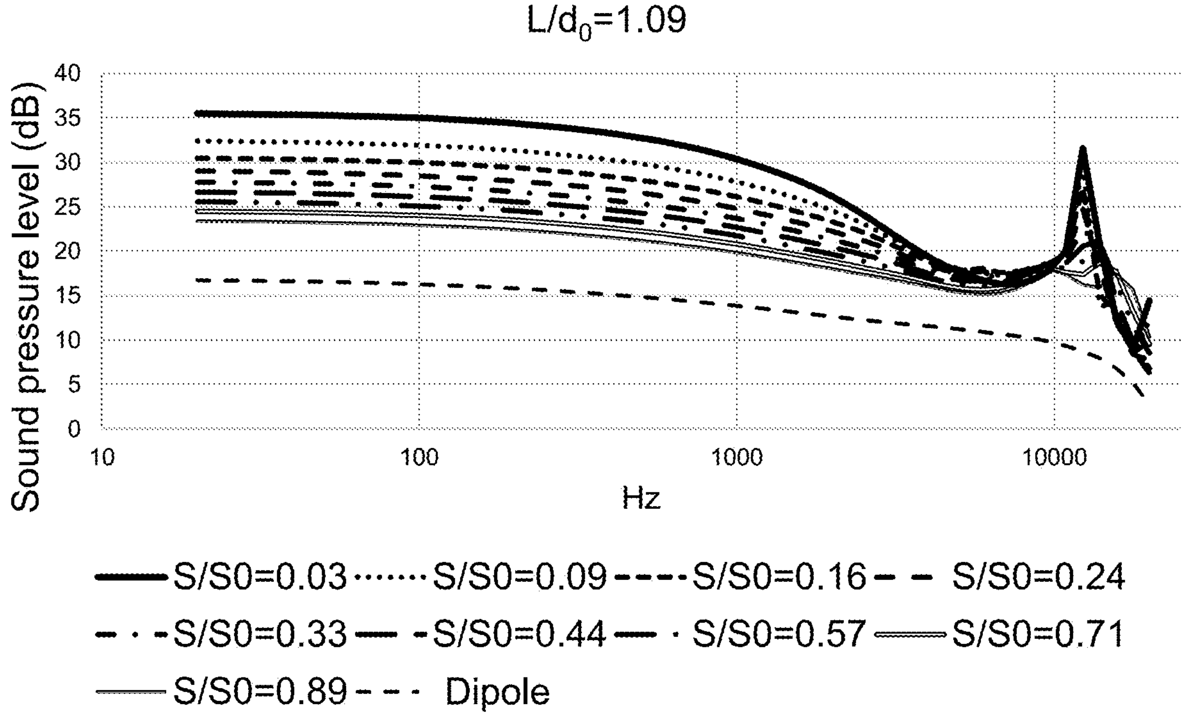
FIG. 7 is a graph illustrating listening indices of cavity-like structures with leaking structures of different sizes according to some embodiments of the present disclosure.

FIG. 6 is a schematic diagram illustrating a cavity-like structure according to some embodiments of the present disclosure. FIG. 7 is a graph illustrating listening indices of cavity-like structures with leaking structures of different dimensions according to some embodiments of the present disclosure. As shown in FIG. 6, an opening area of the leaking structure on the cavity-like structure may be represented as S, and an area of the cavity-like structure directly affected by a contained sound source (e.g., "+" shown in FIG. 6) may be represented as $S_0$. The "directly affected" here means that the sound emitted by the contained sound source may directly acoustically act on a wall of the cavity-like structure without passing through the leaking structure. A distance between two sound sources is $d_0$, and a distance from a center of an opening shape of the leaking structure to another sound source (e.g., "−" in FIG. 6) is L. As shown in FIG. 7, keeping $L/d_0=1.09$ constant, the larger the relative opening size $S/S_0$, the smaller the listening index. This is because the larger the relative opening, the more sound components that the contained sound source radiates directly outward, and the less sound reaching the listening position, causing the listening volume to decrease with the increase of the relative opening, which in turn leads the decrease of the listening index. It may be inferred that the larger the opening, the lower the listening volume at the listening position.

In some embodiments, considering that the relative position of the sound production component 11 and the ear canal of the user (e.g., the cavum concha) may affect a dimension of the gap formed between the sound production component 11 and the cavum concha, e.g., when the free end FE of the sound production component 11 abuts against the cavum concha, the dimension of the gap may be relatively small, and when the free end FE of the sound production component 11 does not abut against the cavum concha, the dimension of the gap may be relatively large. The gap formed between the sound production component 11 and the cavum concha may be referred to as the leaking structure in the acoustic model in FIG. 5. Thus the relative position of the sound production component 11 and the ear canal of the user (e.g., the cavum concha) may affect a count of the leaking structure of the cavity-like structure formed by the sound production component 11 and the cavum concha and the opening size of the leaking structure. However, the opening size of the leaking structure may directly affect the listening quality. Specifically, the larger the opening of the leaking structure, the more sound components that the sound production component 11 radiate directly outward, and the less sound reaching the listening position.

In some embodiments, the sound production component 11 may be a cuboid, quasi-cuboid, cylinder, ellipsoid, or other regular or irregular three-dimensional structures. When the sound production component 11 extends into the cavum concha, as the overall contour of the cavum concha is an irregular structure similar to an arc, the sound production component 11 may not completely cover or fit the contour of the cavity, thus several gaps may be formed. An overall dimension of the gaps may be approximately regarded as the opening S of the leaking structure in the cavity-like model in FIG. 6. A dimension of the sound production component 11 fitting or covering the contour of the cavum concha may be approximately regarded as an unperforated area S0 of the cavity-like structure in FIG. 6. As shown in FIG. 7, the larger the relative opening size S/S0, the smaller the listening index. As the larger the relative opening, the more sound components that the contained sound source radiates directly outward, and the less sound reaching the listening position, causing the listening volume to decrease with the increase of the relative opening, which in turn leads to the decrease in the listening index. In some embodiments, while ensuring that the ear canal is not blocked, it may also be necessary to consider that the dimension of the gaps formed between the sound production component 11 and the cavum concha may be as small as possible, and the overall volume of the sound production component 11 may not be too large or too small. On the premise that the overall volume or shape of the sound production component 11 is specific, the wearing angle of the sound production component 11 relative to the auricle and the cavum concha may be considered. For example, when the sound production component 11 is a quasi-cuboid structure and the user wears the earphone 10, if an inclination angle α1 of the long-axis direction Y of the sound production component 11 relative to the horizontal direction (i.e., the direction of the sagittal axis, e.g., the S-axis as illustrated in FIG. 3 and FIG. 4) is too large or too small, for example, if the long-axis direction Y of the sound production component 11 is set parallel or approximately parallel or set vertical or approximately vertical relative to the horizontal direction (which may also be understood that the long-axis direction Y of the projection of the sound production component 11 on the user's sagittal plane is set parallel or approximately parallel, or set vertical or approximately vertical, relative to the sagittal axis, i.e., the S-axis), a relatively large gap may be formed when the sound production component 11 fits or covers part of the cavum concha of the ear, which may affect the listening volume of the user. It should be noted that the inclination angle α1 of the long-axis direction Y of the projection of the sound production component 11 on the user's sagittal plane relative to the horizontal direction (i.e., the sagittal axis direction, the S-axis as shown in FIG. 3 and FIG. 4) refers to an acute angle formed by an intersection between the long-axis direction Y and the horizontal direction of the projection of the sound production component 11, as shown in FIG. 3 and FIG. 4.

In some embodiments, when a user wears the earphone 10, the wearing angle of the sound production component 11 relative to the auricle and the cavum concha may affect the position of the ear hook extremum point N. Specifically, different inclination angles α1 of the long-axis direction Y of the projection of the sound production component 11 relative to the horizontal direction may lead to a different position of the first rectangular coordinate system xoy, and a different orientation of the first direction, thereby leading to a different extremum point N' and a different position of the ear hook extremum point N relative to the auricle. For example, when the inclination angle α1 of the long-axis direction Y of the projection of the sound production component 11 relative to the horizontal direction is too large, the extremum point N' and the ear hook extremum point N may be too close to the back of the head of the user, and a distance between the ear hook extremum point N and the upper vertex K in the long-axis direction Y is too large, the compatibility between the first portion 121 of the ear hook 12 and the ear 100 may deteriorate and the stability of wearing the earphone 10 may be decreased. When the inclination angle α1 of the long-axis direction Y of the projection of the sound production component 11 relative to the horizontal direction is too small, the extremum point N' and the ear hook extremum point N are too far away from the back of the head of the user, and the distance between the ear hook extremum point N and the upper vertex K in the long-axis direction Y is too small, the gap between the upper side surface US of the sound production component 11 and the cavum concha is too small or a count of gaps is too few, causing the opening of the formed cavity-like structure to be too small or too few, which may lead to a poor effect on sound leakage reduction. In addition, when the distance mentioned above is too small, the upper side surface US of the sound production component 11 may abut against an inner wall of the cavum concha, and may even excessively press the cavum concha of the user, making the user feel uncomfortable and affecting the wearing comfort of the earphone 10.

In order to make the whole or part of the sound production component 11 extend into the cavum concha, increase an area of a region of the cavum concha covered by the sound production component 11, reduce the size of the gap formed between the sound production component 11 and the edge of the cavum concha, and improve the listening volume at the ear canal opening, in some embodiments, inclination angle α1 of the long-axis direction of the projection of the sound production component on the user's sagittal plane relative to the horizontal direction (i.e., the sagittal axis direction, the S-axis in FIG. 3 and FIG. 4) may be within a range of 10°-28° in the wearing state of the earphone 10. Correspondingly, in the projection of the ear hook 12 on the user's sagittal plane, along the long-axis direction Y of the sound production component 11, a distance between the extremum point N' and the projection point K' of the upper vertex K may be within a range of 6 mm-15 mm. In some embodiments, in order to obtain a better listening effect, in the wearing state of the earphone 10, the inclination angle α1 of the long-axis direction of the projection of the sound production component 11 on the user's sagittal plane relative to the horizontal direction (i.e., the sagittal axis direction, the S-axis shown in FIG. 3 and FIG. 4) may be within a range of 13°-21°. Correspondingly, in the long-axis direction Y of the projection of the sound production component 11, the distance between the extremum point N' and the projection point K' of the upper vertex K on the ear hook 12 on the user's sagittal plane may be within a range of 7 mm-12 mm. In some embodiments, in order to further improve the sound leakage reduction effect, in the wearing state of the earphone 10, the inclination angle $\alpha 1$ of the long-axis direction of the projection of the sound production component 11 on the user's sagittal plane relative to the horizontal direction (i.e., the sagittal axis direction, the S-axis shown in FIG. 3 and FIG. 4) may be within a range of 15°-19°. Correspondingly, in the long-axis direction Y of the projection of the sound production component 11, the distance between the extremum point N' and the projection point K' of the upper vertex K on the ear hook 12 on the user's sagittal plane may be within a range of 8 mm-11 mm.

It should be noted that an inclination angle of a projection of the upper side surface US of the sound production component 11 on the sagittal plane relative to the horizontal direction, as well as an inclination angle of a projection of the lower side surface LS on the sagittal plane relative to the horizontal direction may be the same as or different from the inclination angle of the long-axis direction Y of the sound production component 11 relative to the horizontal direction. For example, when the upper side surface US and the lower side surface LS of the sound production component 11 are parallel to the long-axis direction Y, the inclination angle of the projection of the upper side surface US on the sagittal plane relative to the horizontal direction and the inclination angle of the projection of the lower side surface LS on the sagittal plane relative to the horizontal direction may be the same as the inclination angle of the long-axis direction Y of the projection of the sound production component 11 on the sagittal plane relative to the horizontal direction. As another example, when the upper side surface US of the sound production component 11 is parallel to the long-axis direction Y, and the lower side surface LS is not parallel to the long-axis direction Y, or when one of the upper side surface US or the lower side surface LS is a planar wall, and the other is a non-planar wall (e.g., a curved wall), the inclination angle of the projection of the upper side surface US on the sagittal plane relative to the horizontal direction and the inclination angle of the long-axis direction Y of the projection of the sound production component 11 relative to the horizontal direction are the same, and the inclination angle of the projection of the lower side surface LS on the sagittal plane relative to the horizontal direction and the inclination angle of the long-axis direction Y of the projection of the sound production component 11 relative to the horizontal direction are different. In addition, when the upper side surface US or the lower side surface LS is a curved surface, the projection of the upper side surface US or the lower side surface LS on the sagittal plane may be a curved line or a folded line. In this case, the inclination angle of the projection of the upper side surface US on the sagittal plane relative to the horizontal direction may be an included angle between a tangent line at a point with a maximum distance of the curved line or the folded line relative to a ground plane and the horizontal direction, the inclination angle of the projection of the lower side surface LS on the sagittal plane relative to the horizontal direction may be an included angle between a tangent line at a point with a minimum distance of the curved line or the folded line relative to the ground plane and the horizontal direction. In some embodiments, when the upper side surface US or the lower side surface LS is a curved surface, a tangent line on the projection thereof parallel to the long-axis direction Y may also be selected, and an included angle of the tangent line relative to the horizontal direction may be the inclination angle of the projection of the upper side surface US or the lower side surface LS on the sagittal plane relative to the horizontal direction.

It should be noted that a method for measuring a relevant distance and angle of the projection of the earphone 10 on the user's sagittal plane may include: taking a picture parallel to the projection plane (the user's sagittal plane); measuring the relevant distance and angle on the picture, and then converting according to a scale of the picture to obtain actual data of the relevant distance and angle on the projection.

In some embodiments, in addition to reflecting the distance between the ear hook extremum point N and the upper vertex K through the distance of the projection points mentioned above, an actual measurement may also be carried out on the ear hook 12. In some embodiments, the distance between the ear hook extremum point N and the upper vertex K may be within a range of 6 mm-12 mm. In some embodiments, in order to further improve the sound leakage reduction effect, on the ear hook 12, the distance between the ear hook extremum point N and the upper vertex K may be within a range of 7 mm-11 mm. In some embodiments, in order to make the cavity-like structure formed by the sound production component 11 and the cavum concha have a more suitable volume and size/count of the opening, on the ear hook 12, the distance between the ear hook extremum point N and the upper vertex K may be within a range of 8 mm-11 mm.

In some embodiments, since the ear 100 mainly supports the earphone 10 through the upper vertex K of the ear hook 12, when the user wears the earphone 10, it may be regarded as forming a "supporting lever" with the upper vertex K as a support point. In some embodiments, the ear hook extremum point N may be a position with the smallest cross-section on the ear hook 12, so that the ear hook 12 is more likely to deform at the ear hook extremum point N. Therefore, when the user wears the earphone 10, the first portion 121 of the ear hook 12 and the sound production component 11 may form a structure similar to a "clamping force lever" with the ear hook extremum point N as a fulcrum, and the structure is clamped on both sides of the ear of the user (e.g., a front side and a rear side of the cavum concha). In order to improve the stability of the "supporting lever" and the "clamping force lever," a centroid H, the upper vertex K, and the extremum point N of the sound production component 11 may be further described in detail below.

In some embodiments, a position of the mass center H of the sound production component 11 may be directly set to improve the wearing stability and listening effect of the earphone 10. As shown in FIG. 3 and FIG. 4, in some embodiments, a projection point H' of the mass center H of the sound production component 11 on the user's sagittal plane may coincide with a centroid of the projection of the sound production component 11 on the user's sagittal plane. In some embodiments, on the earphone 10, by changing a distance between the mass center H of the sound production component 11 and the ear hook extremum point N, a covering position of the sound production component 11 in the cavum concha in the wearing state and the clamping position of the sound production component 11 on the cavum concha may be changed, which not only affect the wearing stability and the wearing comfort of the earphone 10 but also affect the listening effect of the earphone 10.

When the shape and size of the sound production component 11 are consistent, if the distance between the mass center H of the sound production component 11 and the ear hook extremum point N is too large, the position of the sound production component 11 on the cavum concha may be relatively low, and the gap between the upper side surface US of the sound production component 11 and the cavum concha is too large, which leads to a poor listening effect. Moreover, if the distance between the mass center H of the sound production component 11 and the ear hook extremum point N is too large, the sound production component 11 (or a connection region between the ear hook 12 and the sound production component 11) may be too squeezed on the tragus, which leads to excessive pressure on the tragus by the sound production component 11 and affects the wearing comfort.

When the shape and size of the sound production component 11 are consistent, if the distance between the mass center H of the sound production component 11 and the ear hook extremum point N is too small, the upper side surface US of the sound production component 11 may be attached to an upper edge of the cavum concha, and the gap between the upper side surface US of the sound production component 11 and the cavum concha is too small or a count of the gaps is too few, so that an inside environment and an outside environment are completely sealed and isolated, and the cavity-like structure cannot be formed. Moreover, if the distance between the mass center H of the sound production component 11 and the ear hook extremum point N is too small, the sound production component 11 (or the connection region between the ear hook 12 and the sound production component) may be too squeezed on an outer contour of the ear, which also affects the wearing comfort.

In some embodiments, a projection point of the mass center H of the sound production component 11 on the user's sagittal plane and the centroid of the projection of the sound production component 11 on the user's sagittal plane are point H', and point H' is located on a long-axis of the projection of the sound production component 11, that is, point H' lies on the x-axis. In some embodiments, in order to make the earphone 10 have a better listening effect in the wearing state, a distance between the extremum point N' and the projection point H' of the mass center H of the sound production component 11 on the user's sagittal plane may be within a range of 20 mm-30 mm. In some embodiments, in order to further improve the sound leakage reduction effect, the distance between the extremum point N' and the projection point H' of the mass center H of the sound production component 11 on the user's sagittal plane may be within a range of 22 mm-26 mm. In some embodiments, in order to make the cavity-like structure formed by the sound production component 11 and the cavum concha have a more suitable volume and size/count of the opening, and make the clamping position of the sound production component 11 be located at a better position on the cavum concha, the distance between the extremum point N' and the projection point H' of the mass center H of the sound production component 11 on the user's sagittal plane may be within a range of 23 mm-25 mm.

In some embodiments, in addition to reflecting the distance between the mass center H of the sound production component 11 and the ear hook extremum point N through the distance between the projection points mentioned above, an actual measurement may also be carried out on the ear hook 12. In some embodiments, on the earphone 10, in order to make the earphone 10 have a better listening effect in the wearing state, the distance between the mass center H of the sound production component 11 and the ear hook extremum point N may be within a range of 20 mm-30 mm. In some embodiments, in order to further improve the sound leakage reduction effect, on the earphone 10, the distance between the mass center H of the sound production component 11 and the ear hook extremum point N may be within a range of 24 mm-26 mm. In some embodiments, in order to make the cavity-like structure formed by the sound production component 11 and the cavum concha have a more suitable volume and size/count of the opening, and make the clamping position of the sound production component 11 be located at a better position on the cavum concha, on the earphone 10, the distance between the mass center H of the sound production component 11 and the ear hook extremum point N may be within a range of 24 mm-26 mm.

In some embodiments, an included angle between a connection line connecting the mass center H of the sound production component 11 and the ear hook extremum point N and the long-axis direction Y of the sound production component 11 may affect the position of the sound production component 11 inserted into the cavum concha. When the included angle between the connection line connecting the mass center H of the sound production component 11 and the ear hook extremum point N and the long-axis direction Y of the sound production component 11 is too large, the position of the sound production component 11 on the cavum concha is relatively low, the gap between the upper side surface US of the sound production component 11 and the cavum concha is too large, causing a weak listening effect. When the included angle between the connection line connecting the mass center H of the sound production component 11 and the ear hook extremum point N and the long-axis direction Y of the sound production component 11 is too small, the upper side surface US of the sound production component 11 is attached to an upper edge of the cavum concha, and the gap between the upper side surface US and the cavum concha is too small or the count of the gap is too few, causing a poor sound leakage reduction effect.

In some embodiments, for the convenience of measurement, the included angle between the connection line connecting the mass center H of the sound production component 11 and the ear hook extremum point N and the long-axis direction Y of the sound production component 11 may be characterized by an included angle $\alpha 2$ between a connection line connecting the projection point H' of the mass center H of the sound production component 11 and the extremum point N' and the long-axis direction Y (i.e., the x-axis direction) of the projection of the sound production component 11. In some embodiments, the included angle $\alpha 2$ between the connection line N'H' connecting the projection point H' of the mass center H of the sound production component 11 and the extremum point N' and the long-axis direction Y (i.e., the x-axis direction) of the projection of the sound production component 11 may be less than 90°. Therefore, the projection point H' of the mass center H of the sound production component 11 may be located at a rear side of the extremum point N' in the long-axis direction Y of the sound production component 11, i.e., the mass center H of the sound production component 11 may be located closer to the back of the head of the user as compared to the extremum point N' of the corresponding point N on the ear hook 12, thereby further enhancing the stability of the "clamping force lever." It should be noted that the included angle $\alpha 2$ between the connection line N'H' connecting the projection point H' of the mass center H of the sound production component 11 and the extremum point N and the long-axis direction Y of the projection of the sound production component 11 refers to the smaller included angle formed by the intersection of the connection line N'H' and the long-axis direction Y, as shown in FIG. 4.

In some embodiments, in order to obtain a better listening effect, the included angle α2 between the connection line N'H' connecting the projection point H' of the mass center H of the sound production component 11 and the extremum point N' and the long-axis direction Y of the projection of the sound production component 11 may be within a range of 65°-85°. In some embodiments, in order to further improve the sound leakage reduction effect, the included angle α2 between the connection line N'H' connecting the projection point H' of the mass center H of the sound production component 11 and the extremum point N' and the long-axis direction Y of the projection of the sound production component 11 may be within a range of 70°-80°. In some embodiments, in order to make the cavity-like structure formed by the sound production component 11 and the cavum concha have a more suitable volume and size/count of the opening, and make the clamping position of the sound production component 11 be located at a better position on the cavum concha, the included angle α2 between the connection line N'H' connecting the projection point H' of the mass center H of the sound production component 11 and the extremum point N' and the long-axis direction Y of the projection of the sound production component 11 may be within a range of 75°-79°.

In some embodiments, the included angle between the connection line connecting the mass center H of the sound production component 11 and the ear hook extremum point N and the long-axis direction Y of the sound production component 11 may be represented by an actual angle in a three-dimensional space. In some embodiments, in order to obtain a better listening effect, the included angle between the connection line connecting the mass center H of the sound production component 11 and the ear hook extremum point N and the long-axis direction Y of the sound production component 11 may be within a range of 70°-85°. In some embodiments, in order to further improve the sound leakage reduction effect, on the earphone 10, the included angle between the connection line connecting the mass center H of the sound production component 11 and the ear hook extremum point N and the long-axis direction Y of the sound production component 11 may be within a range of 75°-80°. In some embodiments, in order to make the cavity-like structure formed by the sound production component 11 and the cavum concha have a more suitable volume and size/count of the opening, and make the clamping position of the sound production component 11 be located at a better position on the cavum concha, on the earphone 10, the included angle between the connection line connecting the mass center H of the sound production component 11 and the ear hook extremum point N and the long-axis direction Y of the sound production component 11 may be within a range of 77°-80°. It should be noted that the measurement of the distances of different points on the earphone 10 in three-dimensional space may be carried out in a suitable manner according to an actual situation. For example, for the earphone 10 in a non-wearing state, a distance between two points to be measured on the ear hook 12 may be measured directly with a ruler after determining the positions of the two points to be measured on the ear hook 12. For the earphone 10 in a wearing state, first, a relative position of various parts of the earphone 10 may be fixed, and then the earphone 10 may be removed from the ear (or an ear model used for wearing may be removed) to simulate a morphology of the earphone 10 in the wearing state, and at the same time, to facilitate the subsequent use of the ruler to directly measure distances between different points on the ear hook 12.

In some embodiments, under the premise that the overall volume of the ear hook 12 does not change much, positions of the upper vertex K and the mass center H of the sound production component 11 may reflect a relative position of the sound production component 11 on the ear when the earphone 10 is worn. Specifically, when a distance between the mass center H of the sound production component 11 and the upper vertex K of the ear hook 12 is too large, the position of the sound production component 11 may be closer to the ear canal opening of the user when the earphone 10 is worn. Therefore, the position of the sound production component 11 is low in the cavum concha, and the gap between the upper side surface US of the sound production component 11 and the cavum concha is too large, causing a weak listening effect. When the distance between the mass center H of the sound production component 11 and the upper vertex K of the ear hook 12 is too small, the upper side surface US of the sound production component 11 is attached to the upper edge of the cavum concha, and the gap between the upper side surface US and the cavum concha is too small or the count of the gap is too few, causing the poor sound leakage reduction effect.

In some embodiments, a positional relationship between the mass center H of the sound production component 11 and the upper vertex K may be represented by a positional relationship between a projection point of the mass center H on the user's sagittal plane and a projection point of the upper vertex K on the user's sagittal plane. As shown in FIG. 4, in some embodiments, in the projection of the earphone 10 on the user's sagittal plane, for a better listening effect, a distance between the projection point K' of the upper vertex K and the projection point H' of the mass center H of the sound production component 11 may be within a range of 20 mm-30 mm. In some embodiments, in order to further improve the sound leakage reduction effect, on the projection of the earphone 10 on the user's sagittal plane, the distance between the projection point K' of the upper vertex K and the projection point H' of the mass center H of the sound production component 11 may be within a range of 22 mm-28 mm. In some embodiments, in order to make the cavity-like structure formed by the sound production component 11 and the cavum concha have a more suitable volume and size/count of the opening, the distance between the projection point K' of the upper vertex K and the projection point H' of the mass center H of the sound production component 11 may be within a range of 24 mm-25 mm.

In some embodiments, the positional relationship between the mass center H of the sound production component 11 and the upper vertex K may be represented by their actual positions in three-dimensional space. In some embodiments, in order to obtain a better listening effect, on the earphone 10, a distance between the upper vertex K and the mass center H of the sound production component 11 may be within a range of 20 mm-30 mm. In some embodiments, in order to further improve the sound leakage reduction effect, on the earphone 10, the distance between the upper vertex K and the mass center H of the sound production component 11 may be within a range of 22 mm-28 mm. In some embodiments, in order to make the cavity-like structure formed by the sound production component 11 and the cavum concha have a more suitable volume and size/count of the opening, on the earphone 10, the distance between the upper vertex K and the mass center H of the sound production component 11 may be within a range of 24 mm-26 mm.

In some embodiments, an included angle between a connection line connecting the mass center H of the sound production component 11 and the upper apex K of the ear hook 12 and the long-axis direction Y of the sound production component 11 affects the stability of the earphone 10 in the wearing state. When the included angle between the connection line connecting the mass center H of the sound production component 11 and the upper apex K of the ear hook 12 and the long-axis direction Y of the sound production component 11 is too large, the free end FE of the sound production component 11 may be farther away from the side wall of the cavum concha of the user, the clamping effect of the sound production component 11 on the cavum concha is relatively weak, making the earphone 10 unstable to wear. When the included angle between the connection line connecting the mass center H of the sound production component 11 and the upper apex K of the ear hook 12 and the long-axis direction Y of the sound production component 11 is too small, the free end FE of the sound production component 11 and the cavum concha of the user fits too tight, the wearing comfort of the earphone 10 may be affected.

In some embodiments, for ease of measurement, the included angle between the connection line connecting the mass center H of the sound production component 11 and the upper apex K of the ear hook 12 and the long-axis direction Y of the sound production component 11 may be represented by an included angle $\alpha 3$ between the connection line connecting the projection point H' of the mass center H of the sound production component 11 and the projection point K' of the upper vertex K and the long-axis direction Y of the projection of the sound production component 11. In some embodiments, in order to make the earphone 10 have a high wearing stability and comfort, in the projection of the earphone 10 in the user's sagittal plane, the included angle $\alpha 3$ between the connection line connecting the projection point H' of the mass center H of the sound production component 11 and the projection point K' of the upper vertex K and the long-axis direction Y of the projection of the sound production component 11 may be within a range of 45°-65°. It should be noted that the included angle $\alpha 3$ between the connection line K'H' connecting the projection point H' of the mass center H of the sound production component 11 and the projection point K' of the upper vertex K and the long-axis direction Y of the projection of the sound production component 11 refers to an acute angle formed by intersection of the connection line K'H' and the long-axis direction Y of the projection of the sound production component 11. In some embodiments, in order to further enhance the wearing stability of the earphone 10, the included angle $\alpha 3$ between the connection line K'H' connecting the projection point H' of the mass center H of the sound production component 11 and the projection point K' of the upper vertex K and the long-axis direction Y of the projection of the sound production component 11 may be within a range of 48°-55°. In some embodiments, in order to further enhance the comfort of the earphone 10, the included angle $\alpha 3$ between the connection line K'H' connecting the projection point H' of the mass center H of the sound production component 11 and the projection point K' of the upper vertex K and the long-axis direction Y of the projection of the sound production component 11 may be within a range of 50°-52°.

In some embodiments, the included angle between the connection line connecting the mass center H of the sound production component 11 and the upper vertex K of the ear hook 12 and the long-axis direction Y of the sound production component 11 may be represented by an actual angle in the three-dimensional space. In some embodiments, in order to make the earphone 10 have a high wearing stability and comfort, the included angle $\alpha 3$ between the connection line connecting the mass center H of the sound production component 11 and the upper vertex K of the ear hook 12 and the long-axis direction Y of the sound production component 11 may be within a range of 45°-65°. In some embodiments, in order to further enhance the wearing stability of the earphone 10, the included angle $\alpha 3$ between the connection line connecting the mass center H of the sound production component 11 and the upper vertex K of the ear hook 12 and the long-axis direction Y of the sound production component 11 may be within a range of 47°-54°. In some embodiments, in order to further enhance the comfort of the earphone 10, the included angle $\alpha 3$ between the connection line connecting the mass center H of the sound production component 11 and the upper vertex K of the ear hook 12 and the long-axis direction Y of the sound production component 11 may be within a range of 51°-52°.

Figure 8A:
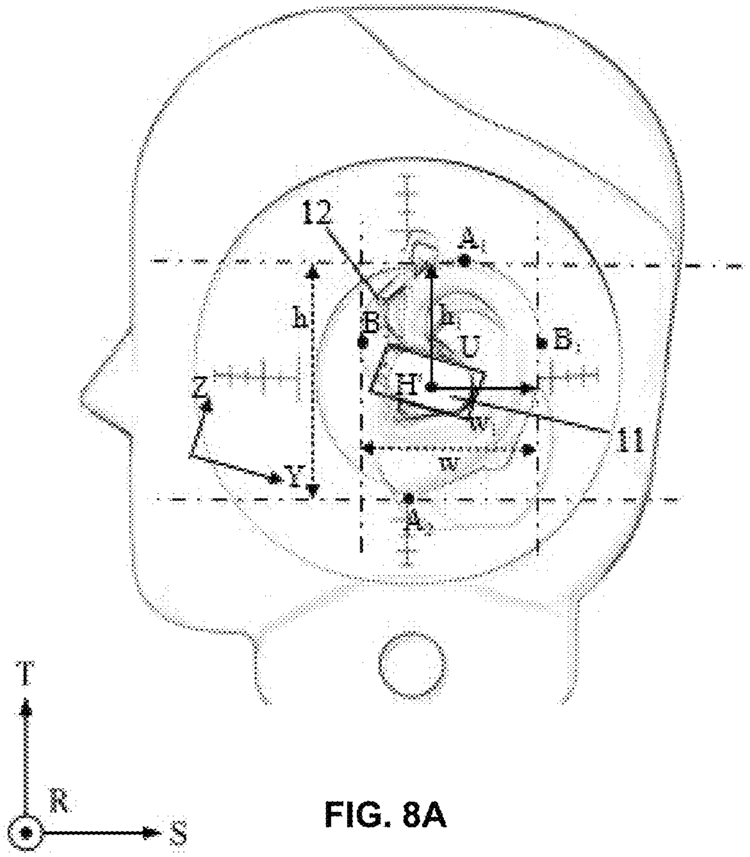
FIG. 8A and FIG. 8B are schematic diagrams illustrating exemplary wearing of an earphone according to some embodiments of the present disclosure.
Figure 8B:
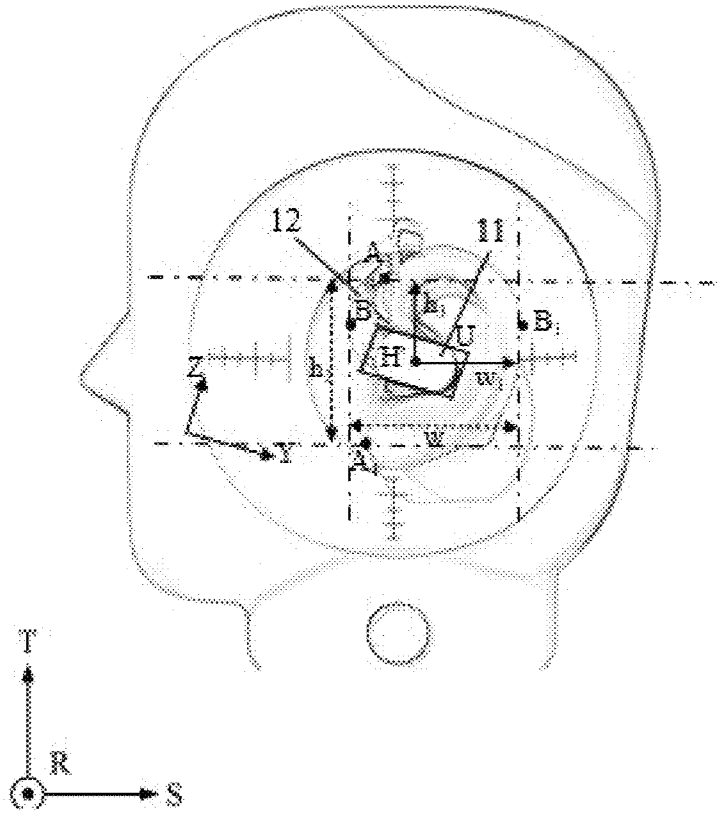

FIG. 8A and FIG. 8B are schematic diagrams illustrating an exemplary wearing state of an earphone according to some embodiments of the present disclosure.

Referring FIG. 3 and FIG. 8A, in some embodiments, when a user wears the earphone 10, the sound production component 11 may have a first projection on a sagittal plane (i.e., a plane formed by a T-axis and an S-axis in FIG. 8A) along a coronal axis direction R. A shape of the sound production component 11 may be a regular or irregular three-dimensional shape. Correspondingly, the first projection of the sound production component 11 on the sagittal plane may be a regular or irregular shape. For example, when the shape of the sound production component 11 is a cuboid, a quasi-cuboid shape, or a cylinder, the first projection of the sound production component 11 on the sagittal plane may be a rectangle or a quasi-rectangle shape (e.g., a racetrack shape). Considering that the first projection of the sound production component 11 on the sagittal plane may be an irregular shape, for the convenience of describing the first projection, a rectangular region shown in a solid line box U may be delineated around the projection (i.e., the first projection) of the sound production component 11 in FIG. 8A and FIG. 8B, and a centroid of the rectangular region shown by the solid line box U may be approximately regarded as the centroid of the first projection. As previously described, the projection point H' of the mass center H of the sound production component 11 on the user's sagittal plane coincides with the centroid of the projection of the sound production component 11 on the user's sagittal plane, and thus the centroid of the first projection is the projection point H'. It should be noted that the above description of the first projection and the centroid thereof are only examples, and a shape of the first projection is related to the shape of the sound production component 11 or a wearing condition relative to the ear. In some embodiments, in order to more clearly describe the first projection of the sound production component, merely by way of example, the confirmation process of the solid line box U may be as follows: two farthest points of the sound production component 1 in the long-axis direction Y may be determined, and a first line segment and a second line segment parallel to the short-axis direction Z through these two farthest points may be drawn, respectively; two farthest points of the sound production component 11 in the short-axis direction Z may be determined, a third line segment and a fourth line segment parallel to the long-axis direction Y through these two farthest points may be drawn, and the rectangular region of the solid line box U in FIG. 8A and FIG. 8B may be obtained by a region formed by the above line segments.

In some embodiments, the auricle has a second projection on the sagittal plane along the coronal-axis direction R. The highest point of the second projection may be understood as a point with a largest distance in the vertical-axis direction relative to a projection point of a certain point on the neck of the user on the sagittal plane among all the projection points, i.e., a projection of the highest point of the auricle (e.g., point A1 in FIG. 8A) on the sagittal plane may be the highest point of the second projection. The lowest point of the second projection may be understood as a point with a smallest distance in the vertical-axis direction relative to a projection point of a certain point of the neck of the user on the sagittal plane among all the projection points, i.e., a projection of the lowest point of the auricle (e.g., point A2 in FIG. 8A) on the sagittal plane may be the lowest point of the second projection. A height of the second projection in the vertical-axis direction may be a difference (height h shown in FIG. 8A) between the point with the largest distance and the point with the smallest distance in the vertical-axis direction and the smallest point of the projection relative to a projection of a certain point of the neck of the user on the sagittal plane among all the projection points in the second projection, i.e., the distance between point A1 and point A2 in the vertical-axis direction T. The end point of the second projection may be understood as a point with the largest distance in the sagittal axis direction relative to the projection of the nose tip of the user on the sagittal plane among all the projection points, i.e., the projection of the end point of the auricle (e.g., point B1 in FIG. 8A) on the sagittal plane may be the end point of the second projection. The front end point of the second projection may be understood as a point with the smallest distance in the sagittal axis direction relative to the projection of the nose tip of the user on the sagittal plane among all projection points, i.e., the projection of the front end point of the auricle (e.g., point B2 shown in FIG. 8A) on the sagittal plane may be the front end point of the second projection. The width of the second projection in the sagittal axis direction may be a difference (the width w shown in FIG. 8A) between the point with the largest distance and the point with the smallest distance along the sagittal axis direction relative to the projection of the nose tip on the sagittal plane among all projection points in the second projection, i.e., the distance between the point B1 and the point B2 in the sagittal axis direction S. It should be noted that the projections of structures such as the sound production component 11 or the auricle on the sagittal plane in the embodiments of the present disclosure refer to projections on the sagittal plane along the coronal axis direction R, which is not emphasized in the disclosure hereinafter.

In some embodiments, when a ratio of a first distance h1 between the projection point H' (i.e., the centroid H' of the first projection) of the mass center H of the sound production component 11 on the user's sagittal plane and the highest point of the second projection of the auricle on the user's sagittal plane in the vertical-axis direction to the height h of the second projection of the auricle on the user's sagittal plane in the vertical-axis direction is within a range of 0.25-0.6, and a ratio of a second distance w1 between the projection point H' (i.e., the centroid H' of the first projection) of the mass center H of the sound production component 11 on the user's sagittal plane and the end point of the second projection of the auricle on the user's sagittal plane in the sagittal-axis direction to the width w of the second projection of the auricle on the user's sagittal plane in the sagittal-axis direction is within a range of 0.4-0.7, the part or whole structure of the sound production component 11 may substantially cover the antihelix region of the user (e.g., the position in the triangular fossa, the superior crus of antihelix, the inferior crus of antihelix, or the position of the antihelix, the position of the sound production component 11C relative to the ear shown in FIG. 2), or part or whole structure of the sound production component 11 may extend into the cavum concha (e.g., the position of the sound production component 11B relative to the ear shown in FIG. 2). In some embodiments, in order to make the whole or part structure of the sound production component 11 cover the antihelix region of the user (e.g., the position in the triangular fossa, the superior crus of antihelix, the inferior crus of antihelix, or the position of the antihelix, as the position of the sound production component 11C relative to the ear shown in FIG. 2), the ratio of the first distance h1 between the projection point H' (i.e., the centroid H' of the first projection) of the mass center H of the sound production component 11 on the user's sagittal plane and the highest point of the second projection of the auricle on the user's sagittal plane in the vertical-axis direction to the height h of the second projection of the auricle on the user's sagittal plane in the vertical-axis direction may be within a range of 0.25-0.4, and the ratio of the second distance w1 between the projection point H' (i.e., the centroid H' of the first projection) of the mass center H of the sound production component 11 on the user's sagittal plane and the end point of the second projection of the auricle on the user's sagittal plane in the sagittal-axis direction to the width w of the second projection of the auricle on the user's sagittal plane in the sagittal-axis direction may be within a range of 0.4-0.6. When the whole or part structure of the sound production component 11 covers the antihelix region of the user, the housing of the sound production component 11 may act as a baffle to increase a sound path difference from a sound outlet and a pressure relief hole to an ear canal opening, thereby increasing the sound intensity at the ear canal opening. Furthermore, in the wearing state, a sidewall of the sound production component 11 may be attached to the antihelix region, and a concave-convex structure of the antihelix region may also act as a baffle, to increase a sound path of the transmission of the sound from the pressure relief hole to the ear canal opening, thereby increasing the sound path difference between the sound outlet and the pressure relief hole to the ear canal opening. In addition, when the whole or part of the sound production component 11 covers the antihelix region of the user, the sound production component 11 may not extend into the ear canal opening of the user, which may ensure that the ear canal opening remains fully open, thereby obtaining sound information in the external environment for the user, and improving the wearing comfort for the user. The specific description regarding the whole or part structure of the sound production component 11 substantially covering the antihelix region of the user may be found elsewhere in in the present disclosure.

In some embodiments, in order to make the whole or part of the structure of the sound production component 11 extend into the cavum concha, e.g., the position of the sound production component 11B relative to the ear as shown in FIG. 2, the ratio of the first distance h1 between the projection point H' (i.e., the centroid H' of the first projection) of the mass center H of the sound production component 11 on the user's sagittal plane and the highest point of the second projection of the auricle on the user's sagittal plane in the vertical-axis direction to the height h of the second projection of the auricle on the user's sagittal plane in the vertical-axis direction may be within a range of 0.35-0.6, and the ratio of the second distance w1 between the projection point H' (i.e., the centroid H' of the first projection) of the mass center H of the sound production component 11 on the user's sagittal plane and the end point of the second projection of the auricle on the user's sagittal plane in the sagittal-axis direction to the width w of the second projection of the auricle on the user's sagittal plane in the sagittal-axis direction may be within a range of 0.4-0.65. When the user wears the earphone provided in the embodiments of the present disclosure, by controlling the ratio of the first distance h1 between the centroid H' (i.e., the projection point H' of the mass center H of the sound production component 11 on the user's sagittal plane) of the first projection point and the highest point of the second projection of the auricle on the user's sagittal plane in the vertical-axis direction to the height h of the second projection in the vertical-axis direction to be within a range of 0.35-0.6, and the ratio of the second distance w1 between the centroid H' of the first projection and the end point of the second projection in the sagittal-axis direction, to the width w of the second projection in the sagittal-axis direction to be within a range of 0.4-0.65, the sound production component 11 may be made to extend at least partially into the cavum concha and to form the acoustic model shown in FIG. 5 with the cavum concha of the user, thereby increasing the listening volume of the earphone at a listening position (e.g., at the ear canal opening), especially at low and mid frequencies, while maintaining a good effect of far-field sound leakage cancellation. When the whole or part of the structure of the sound production component 11 extend into the cavum concha, the sound outlet may be closer to the ear canal opening, which further improves the listening volume at the ear canal opening. In addition, the cavum concha may play a certain supporting and limiting role for the sound production component 11 so as to improve the stability of the earphone in the wearing state.

It should also be noted that an area of the first projection of the sound production component 11 on the sagittal plane may be generally much smaller than an area of the second projection of the auricle on the sagittal plane to ensure that the ear canal opening of the user can not be blocked when the user wears the earphone 10, and the load on the user when wearing the earphone may be reduced, which is convenient for the user to carry daily. On this premise, in the wearing state, when ratio of the first distance h1 between the centroid H' of the projection (the first projection) of the sound production component 11 on the sagittal plane and the projection (the highest point of the second projection) of the highest point A1 of the auricle on the sagittal plane in the vertical-axis direction to the height h of the second projection in the vertical-axis direction is too small or too large, part of the structure of the sound production component 11 may be located above the top of the auricle or at the earlobe of the user, which may be impossible to use the auricle to sufficiently support and limit the sound production component 11, and there may be a problem that the wearing is unstable and easy to fall off. On the other hand, it may also cause the sound outlet set on the sound production component 11 to be away from the ear canal opening, affecting the listening volume at the ear canal opening of the user. In order to ensure that the earphone does not block the ear canal opening of the user and ensure the stability and comfort of the user wearing the earphone and a good listening effect, in some embodiments, the ratio of the first distance h1 between the centroid H' of the first projection and the highest point A1 of the second projection in the vertical-axis direction to the height h of the second projection in the vertical-axis direction may be controlled to be within a range of 0.35-0.6, so that when part or the whole structure of the sound production component extends into the cavum concha, the force exerted by the cavum concha on the sound production component 11 may support and limit the sound production component 11 to a certain extent, thereby improving the wearing stability and comfort of the earphone. Meanwhile, the sound production component 11 may also form the acoustic model shown in FIG. 5 with the cavum concha, to ensure the listening volume of the user at the listening position (e.g., the ear canal opening) and reduce the far-field leakage volume. In some embodiments, in order to further enhance the wearing stability and comfort of the earphone 10 and to enhance the acoustic output effect of the sound production component 11, the ratio of the first distance h1 between the centroid H' of the first projection and the highest point A1 of the second projection in the vertical-axis direction to the height h of the second projection in the vertical-axis direction may be within a range of 0.35-0.55. In some embodiments, in order to further enhance the wearing stability and comfort of the earphone 10 and to enhance the acoustic output effect of the sound production component 11, the ratio of the first distance h1 between the centroid H' of the first projection and the highest point A1 of the second projection in the vertical-axis direction to the height h of the second projection in the vertical-axis direction may be within a range of 0.4-0.5.

Similarly, when the ratio of the second distance w1 between the centroid H' of the first projection and the end point of the second projection in the sagittal-axial direction to the width w of the second projection in the sagittal-axial direction is too large or too small, the part of whole structure of the sound production component 11 may be located in a facial region on the front side of the ear, or extend out of an outer contour of the auricle, which may also cause the problem that the sound production component 11 cannot construct the acoustic model in FIG. 5 with the cavum concha, and also lead to unstable wearing of the earphone 10. According to the open earphone provided in the embodiments of the present disclosure, the ratio of the second distance w1 between the centroid H' of the first projection and the end point of the second projection in the sagittal-axial direction to the width w of the second projection in the sagittal-axial direction may be controlled to be within a range of 0.4-0.7, thereby improving the wearing stability and comfort of the earphone while ensuring the acoustic output effect of the sound production component. In some embodiments, in order to further enhance the acoustic output effect of the sound production component 11, and enhance the wearing stability and comfort of the earphone 10, the ratio of the second distance w1 between the centroid H' of the first projection and the end point of the second projection in the sagittal-axial direction to the width w of the second projection in the sagittal-axial direction may be within a range of 0.45-0.68. In some embodiments, in order to further enhance the acoustic output effect of the sound production component 11, and enhance the wearing stability and comfort of the earphone 10, the ratio of the second distance w1 between the centroid H' of the first projection and the end point of the second projection in the sagittal-axial direction to the width w of the second projection in the sagittal-axial direction may be controlled to be within a range of 0.5-0.6.

For example, the height h of the second projection in the vertical-axis direction may be within a range of 55 mm-65 mm. In the wearing state, if the first distance h1 between the centroid H' of the first projection and the highest point of the second projection in the vertical-axis direction is less than 15 mm or greater than 50 mm, the sound production component 11 may be located away from the cavum concha, which not only fails to construct the acoustic model in FIG. 5 but also has the problem of unstable wearing. Therefore, in order to ensure the acoustic output effect of the sound production component and the wearing stability of the earphone, the first distance h1 between the centroid H' of the first projection and the highest point of the second projection in the vertical-axis direction may be controlled to be within a range of 15 mm-50 mm. Similarly, in some embodiments, the width w of the second projection in the sagittal-axis direction may be within a range of 40 mm-55 mm. When the second distance w1 between the centroid H' of the first projection and the end point of the second projection in the sagittal-axis direction is greater than 45 mm or less than 15 mm, the sound production component 11 may be too forward or too backward relative to the ear of the user, causing that the sound production component 11 may not construct the acoustic model in FIG. 5 and the unstable wearing of the open earphone 10. Therefore, in order to ensure the acoustic output effect of the sound production component 11 and the wearing stability of the earphone, the second distance w1 between the centroid H' of the first projection and the end point of the second projection in the sagittal-axis direction may be controlled to be within a range of 15 mm-45 mm.

In some embodiments, considering that the relative position of the sound production component 11 and the ear canal of the user (e.g., the cavum concha) may affect a dimension of the gap formed between the sound production component 11 and the cavum concha, e.g., when the free end FE of the sound production component 11 abuts against the cavum concha, the dimension of the gap may be relatively small, and when the free end FE of the sound production component 11 does not abut against the cavity of the auricular concha, the dimension of the gap may be relatively large. The gap formed between the sound production component 11 and the cavum concha may be referred to as the leaking structure in the acoustic model in FIG. 5. The relative position of the sound production component 11 and the ear canal of the user (e.g., the cavum concha) may affect a count of the leaking structure of the cavity-like structure formed by the sound production component 11 and the cavum concha and the opening size of the leaking structure, and the opening size of the leaking structure may directly affect the listening quality. Specifically, the larger the opening of the leaking structure, the more sound components that the sound production component 11 radiate directly outward, and the less sound reaching the listening position. Accordingly, in order to consider the listening volume of the sound production component 11 and the sound leakage reduction effect to ensure the acoustic output quality of the sound production component 11, the sound production component 11 may be fit as closely as possible to the cavum concha of the user. Correspondingly, the ratio of the first distance h1 between the centroid H' of the first projection and the highest point of the second projection in the vertical-axis direction to the height h of the second projection in the vertical-axis direction may be controlled to be within a range of 0.35-0.6, while the ratio of the second distance w1 between the centroid H' of the first projection and the end point of the second projection in the sagittal axis direction to the width w of the second projection in the sagittal axis direction may be controlled to be within a range of 0.4-0.65. In some embodiments, in order to improve the wearing comfort of the earphone 10 while ensuring the acoustic output quality of the sound production component 11, the ratio of the first distance h1 between the centroid H' of the first projection and the highest point of the second projection in the vertical-axis direction to the height h of the second projection in the vertical-axis direction may be within a range of 0.35-0.55, and the ratio of the second distance w1 between the centroid H' of the first projection and the end point of the second projection in the sagittal axis direction to the width w of the second projection in the sagittal axis direction may be within a range of 0.45-0.68. In some embodiments, in order to further enhance the acoustic output quality of the sound production component 11 as well as the wearing comfort of the earphone 10, the ratio of the first distance h1 between the centroid H' of the first projection and the highest point of the second projection in the vertical-axis direction to the height h of the second projection in the vertical-axis direction may be within a range of 0.35-0.5, and the ratio of the second distance w1 between the centroid H' of the first projection and the end point of the second projection in the sagittal axis direction to the width w of the second projection in the sagittal axis direction may be within a range of 0.48-0.6.

In some embodiments, considering that there may be certain differences in the shape and dimension of the ears of different users, the ratio range may fluctuate within a certain range. For example, when the earlobe of the user is long, the height h of the second projection in the vertical-axis direction may be larger than that of the general situation. At this time, when the user wears the earphone 100, the ratio of the first distance h1 between the centroid H' of the first projection and the highest point of the second projection in the vertical-axis direction to the height h of the second projection in the vertical-axis direction may be smaller, e.g., which may be within a range of 0.2-0.55. Similarly, in some embodiments, when the helix of the user is bent forward, the width w of the second projection in the sagittal axis direction be smaller than that of the general situation, and the second distance w1 between the centroid H' of the first projection and the end point of the second projection in the sagittal axis direction may also be relatively small. At this time, when the user wears the earphone 100, the ratio of the second distance w1 between the centroid H' of the first projection and the end point of the second projection in the sagittal axis direction to the width w of the second projection in the sagittal axis direction may be larger, e.g., which may be within a range of 0.4-0.75.

The ears of different users are different. For example, some users have longer earlobes. At this time, it may have an effect if the earphone 10 is limited using the ratio of the distance between the centroid H' of the first projection and the highest point of the second projection to the height of the second projection on the vertical axis. As shown in FIG. 8B, a highest point A3 and a lowest point A4 of a connection region between the auricle of the user and the head of the user may be selected for illustration. The highest point of the connection part between the auricle and the head may be understood as a position where the projection of the connection region of the auricle and the head on the sagittal plane has a largest distance from a projection of a specific point on the neck on the sagittal plane. The lowest point of the connection part between the auricle and the head may be understood as a position where the projection of the connection region of the auricle and the head on the sagittal plane has a smallest distance from a projection of a specific point on the neck on the sagittal plane. In order to consider the listening volume of the sound production component 11 and the sound leakage reduction effect to ensure the acoustic output quality of the sound production component 11, the sound production component 11 may be fit as closely as possible to the cavum concha of the user. Correspondingly, a ratio of a distance h3 between the centroid H' of the first projection and a highest point of a projection of the connection region of the auricle and the head on the sagittal plane in the vertical-axis direction to a height h2 between a highest point and a lowest point of the projection of the connection region of the auricle and the head on the sagittal plane in the vertical-axis direction may be controlled to be within a range of 0.4-0.65. Meanwhile, the ratio of the second distance w1 between the centroid H' of the first projection and the end point of the second projection in the sagittal axis direction to the width w of the second projection in the sagittal axis direction may be controlled to be within a range of 0.4-0.65. In some embodiments, in order to improve the wearing comfort of the earphone 10 while ensuring the acoustic output effect of the sound production component 11, the ratio of the distance h3 between the centroid H' of the first projection and the highest point of the projection of the connection region of the auricle and the head on the sagittal plane in the vertical-axis direction to the height h2 between the highest point and the lowest point of the projection of the connection region of the auricle and the head on the sagittal plane in the vertical-axis direction may be controlled to be within a range of 0.45-0.6, and the ratio of the second distance w1 between the centroid H' of the first projection and the end point of the second projection in the sagittal axis direction to the width w of the second projection in the sagittal axis direction may be within a range of 0.45-0.68. In some embodiments, in order to further enhance the acoustic output effect of the sound production component 11 as well as the wearing comfort of the earphone 10, the ratio of the distance h3 between the centroid H' of the first projection and the highest point of the projection of the connection region of the auricle and the head on the sagittal plane in the vertical-axis direction to the height h2 between the highest point and the lowest point of the projection of the connection region of the auricle and the head on the sagittal plane in the vertical-axis direction may be within a range of 0.5-0.6, and the ratio of the second distance w1 between the centroid H' of the first projection and the end point of the second projection in the sagittal axis direction to the width w of the second projection in the sagittal axis direction may be within a range of 0.48-0.6.

Figure 9:
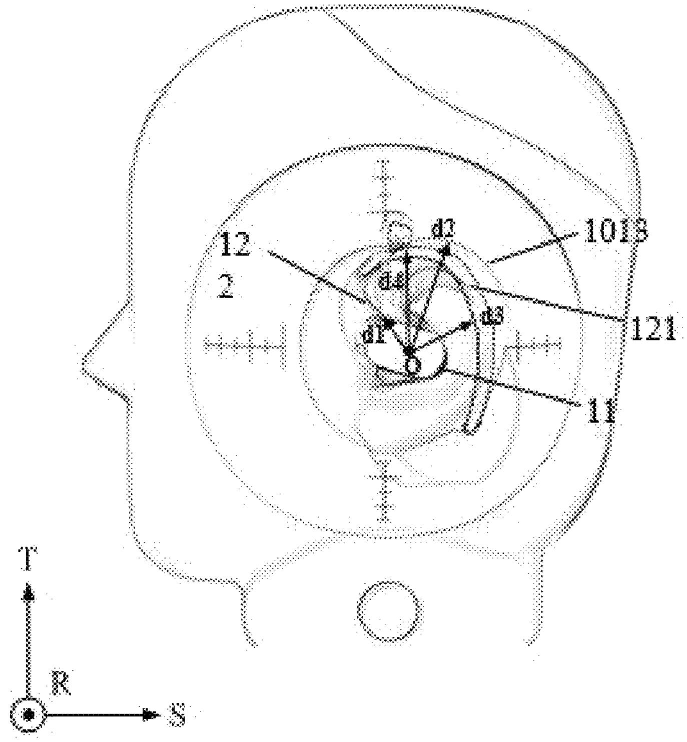
FIG. 9 is a schematic diagram illustrating exemplary wearing of an earphone according to some other embodiments of the present disclosure.

FIG. 9 is a schematic diagram illustrating exemplary wearing of an earphone according to other embodiments of the present disclosure. Referring to FIG. 3 and FIG. 9, when the user wears the earphone 10 and the sound production component 11 extends into the cavum concha, the projection point H' (i.e., the centroid H' of the first projection of the sound production component 11 in the sagittal plane) of the mass center H of the sound production component 11 in the sagittal plane may be located in an area enclosed by a contour of the second projection of the auricle on the sagittal plane, wherein the contour of the second projection may be understood as a projection of an outer contour of the helix of the user, a contour of the earlobe, a contour of the tragus, an intertragic notch, an antitragic apex, an antihelix-antitragus notch, etc., on the sagittal plane. In some embodiments, the listening volume of the sound production component 11, the sound leakage reduction effect, and the wearing comfort and stability may be improved by adjusting a distance between the centroid H' of the first projection and the contour of the second projection. For example, when the sound production component 11 is located at the top of the auricle, the earlobe, the facial region on the front side of the auricle, or between the inner contour 1014 of the auricle and the outer edge of the cavum concha, it may be specifically embodied as that a distance between the centroid H' of the first projection and a point of a certain region of the contour of the second projection is too small, and a distance between the centroid H' of the first projection and a point of another region of the contour of the second projection is too large, and the sound production component may not form a cavity-like structure (acoustic model in FIG. 5) with the cavum concha, affecting the acoustic output effect of the earphone 10. In order to ensure the acoustic output quality when the user wears the earphone 10, in some embodiments, in some embodiments, the distance between the centroid H' of the first projection and the contour of the second projection may be within a range of 10 mm-52 mm, i.e., the distance between the centroid H' of the first projection and any point of the contour of the second projection may be within a range of 10 mm-52 mm. Preferably, in order to further improve the wearing comfort of the earphone 10 and optimize the cavity-like structure formed by the sound production component 11 and the cavum concha, the distance between the centroid H' of the first projection and the contour of the second projection may be within a range of 12 mm-50.5 mm. In some embodiments, in order to further enhance the wearing comfort of the earphone 10, as well as to optimize the cavity-like structure formed by the sound production component 11 in cooperation with the cavum concha, the distance between the centroid H' of the first projection and the contour of the second projection may also be within a range of 13.5 mm-50.5 mm. In some embodiments, by controlling the distance between the centroid H' of the first projection and the contour of the second projection to be within a range of 10 mm-52 mm, most of the sound production component 11 may be located near the ear canal of the user, and at least part of the sound production component may extend into the cavum concha of the user to form the acoustic model in FIG. 5, thereby ensuring that the sound output by the sound production component 11 may be better transmitted to the user. For example, in some embodiments, a minimum distance d1 between the centroid H' of the first projection and the contour of the second projection may be 20 mm, and a maximum distance d2 between the centroid H' of the first projection and the contour of the second projection may be 48.5 mm. In some embodiments, in the wearing state of the earphone 10, at least part of the sound production component 11 covers an antihelix region of the user, which may fully expose the ear canal opening, and make the user better receive sounds from the external environment. At this time, the centroid H' of the first projection of the sound production component 11 on the sagittal plane of the head of the user may also be located in the area surrounded by the contour of the second projection, but compared with the at least part of the sound production component 11 extending into the cavum concha of the user, in the wearing state, the distance between the centroid H' of the first projection of the sound production component 11 on the sagittal plane of the head of the user and the contour of the second projection may be different. In some embodiments, in order to consider the listening volume of the sound production component 11, the sound leakage reduction effect, the effect of receiving the sound of the external environment, and reducing the region between the free end FE of the sound production component 11 and the inner contour 1014 of the auricle as much as possible in the wearing manner, to make the sound production component 11 have better acoustic output quality, the distance between the centroid H' of the first projection and the contour of the second projection may be within a range of 13 mm-54 mm. In some embodiments, in order to further enhance the acoustic output quality of the sound production component 11, the distance between the centroid H' of the first projection and the contour of the second projection may be within a range of 18 mm-50 mm. In some embodiments, in order to further enhance the acoustic output quality of the sound production component 11, the distance between the centroid H' of the first projection and the contour of the second projection may be within a range of 20 mm-45 mm. In some embodiments, by controlling the distance between the centroid H' of the first projection of the sound production component 11 on the sagittal plane of the head of the user and the contour of the second projection to be within a range of 23 mm-40 mm, the sound production component 11 may be roughly located in the antihelix region of the user, and at least part of the sound production component 11 may form the baffle with the antihelix region, to increase the sound path of the sound emitted from the pressure relief hole to the external ear canal 101, thereby increasing the sound path difference from the sound outlet and the pressure relief hole to the external ear canal 101, increasing the sound intensity at the external ear canal 101, and reducing the volume of far-field sound leakage.

In some embodiments, considering that when the user wears the earphone 10, if a distance between the centroid H' of the first projection and a projection of the first portion 121 of the ear hook 12 on the sagittal plane is too large, it may cause unstable wearing (at this time, an effective clamping of the ear may not be formed between the sound production component 11 and the ear hook 12), and the problem that the sound production component 11 may not effectively extend into the cavum concha. If the distance is too small, it may affect the relative position of the sound production component to the cavum concha of the user and the ear canal opening, and may also cause the sound production component 11 or the ear hook 12 to press the ear, resulting in poor wearing comfort. Accordingly, in order to avoid the problems, in some embodiments, the distance between the centroid H' of the first projection and the projection of the first portion 121 of the ear hook 12 on the sagittal plane may be within a range of 18 mm-43 mm. By controlling the distance to be within the range of 18 mm-43 mm, the ear hook 12 may fit the ear of the user better, and the sound production component 11 may be ensured to be just located at the cavum concha of the user, and the acoustic model in FIG. 5 may be formed, thereby ensuring that the sound output by the sound production component 11 may be better transmitted to the user. In some embodiments, in order to further improve the wearing stability of the earphone 10 and ensure the listening effect of the sound production component 11 at the ear canal opening, in some embodiments, the distance between the centroid H' of the first projection and the projection of the first portion 121 of the ear hook 12 on the sagittal plane may be within a range of 20 mm-41 mm. In some embodiments, in order to further enhance the wearing stability of the earphone 10 and ensure the listening effect of the sound production component 11 at the ear canal opening, the distance between the centroid H' of the first projection and the projection of the first portion 121 of the ear hook 12 on the sagittal plane may be within a range of 22 mm-40.5 mm. For example, a minimum distance d3 between the centroid H' of the first projection and the projection of the first portion 121 of the ear hook 12 on the sagittal plane may be 21 mm, and a maximum distance d4 between the centroid H' of the first projection on the sagittal plane of the user and the projection of the first portion 121 of the ear hook 12 on the sagittal plane may be 41.2 mm.

In some embodiments, due to the elasticity of the ear hook, the distance between the sound production component 11 and the ear hook may vary (usually the distance in the non-wearing state may be smaller than that in the wearing state) in the wearing state and the non-wearing state. For example, in some embodiments, when the earphone 10 is in the non-wearing state, a projection point of a mass center of the sound production component 11 on a specific reference plane and a centroid of a projection of the sound production component 11 on the specific reference plane still remain coincident. In some embodiments, in order to make the ear hook 12 fit better with the ear of the user to enhance the wearing stability of the earphone 10, and at the same time to ensure that the sound production component 11 is located exactly at the cavum concha of the user to enhance the listening effect of the sound production component 11 at the ear canal opening, a distance between the projection point of the mass center of the sound production component 11 on the specific reference plane (i.e., the centroid of a projection of the sound production component 11 on the specific reference plane) and the projection of the first portion 121 of the ear hook 12 on the specific reference plane may be within a range of 13 mm-38 mm. In some embodiments, in order to further enhance the wearing stability of the earphone 10 and to ensure the listening effect of the sound production component 11 at the ear canal opening, when the earphone 10 is in the non-wearing state, the distance between the projection point of the mass center of the sound production component 11 on the specific reference plane (i.e., the centroid of the projection of the sound production component 11 on the specific reference plane) and the projection of the first portion 121 of the ear hook 12 on the specific reference plane may be within a range of 16 mm-36 mm. In some embodiments, by making the distance between the projection point of the mass center of the sound production component 11 on the specific reference plane (i.e., the centroid of the projection of the sound production component 11 on the specific reference plane) and the projection of the first portion 121 of the ear hook 12 on the specific reference plane slightly smaller in the non-wearing state than in the wearing state, the ear hook 12 of the earphone 10 may be able to generate a certain clamping force on the ear of the user when the earphone 10 is in the wearing state, thus making it possible to improve the stability of the user when wearing the earphone 10 without affecting the wearing experience. In some embodiments, the specific reference plane may be the sagittal plane. At this time, in the non-wearing state, the centroid of the projection of the sound production component 11 on the sagittal plane may be compared to the centroid of the projection of the sound production component on the specific reference plane. For example, the non-wearing state may be represented by removing the auricle structure from the human head model, and fixing the sound production component on the human head model in the same posture as the wearing state by using a fixing component or adhesive. In some embodiments, the specific reference plane may be an ear hook plane S1. An ear hook structure may be an arc structure. The ear hook plane S1 may be a plane formed by three most protruding points on the ear hook 12, i.e., the plane that supports the ear hook 12 when the ear hook 12 is placed freely (i.e., not subject to external force). For example, when the ear hook 12 is freely placed on a horizontal plane, the horizontal plane may support the ear hook 12, and the horizontal plane may be regarded as the ear hook plane S1. In other embodiments, the ear hook plane S1 also refers to a plane formed by a bisector that bisects or roughly bisects the ear hook 12 along a length extension direction of the ear hook 12. In the wearing state, although the ear hook plane S1 has a certain angle relative to the sagittal plane, the ear hook 12 may be approximately regarded as fitting the head at this time, and thus the angle is very small. For the convenience of calculation and description, it may also be possible to use the ear hook plane S1 as the specific reference plane instead of the sagittal plane.

In some embodiments, an included angle α4 between a connection line connecting the mass center H of the sound production component 11 and the ear hook extremum point N and a plane S1 where the ear hook 12 is located (which is also referred to as an ear hook plane S1) may affect a degree to which the sound production component 11 is inserted into the cavum concha of the user when the earphone 10 is in the wearing state. If the included angle α4 between the connection line connecting the mass center H of the sound production component 11 and the ear hook extremum point N and the plane of the ear hook 12 is too small, the sound production component 11 may be inserted too deep into the cavum concha, and the position of the sound production component 11 may be too close to the ear canal opening of the user. In this case, the ear canal opening is blocked to a certain extent, and the communication between the ear canal opening and the external environment cannot be realized, thus an original design purpose of the earphone 10 cannot be implemented. If the included angle α4 between the connection line connecting the mass center H of the sound production component 11 and the ear hook extremum point N and the plane of the ear hook 12 is too large, it may affect the sound production component 11 to be inserted into the cavum concha (e.g., causing a gap between the sound production component 11 and the cavum concha to be too large), which further affects the listening effect of the sound production component 11. It should be noted that the included angle between the connection line NH connecting the ear hook extremum point N and the mass center H of the sound production component 11 refers to a smaller included angle formed by the intersection of the connection line NH and the ear hook plane S1.

Figure 10:
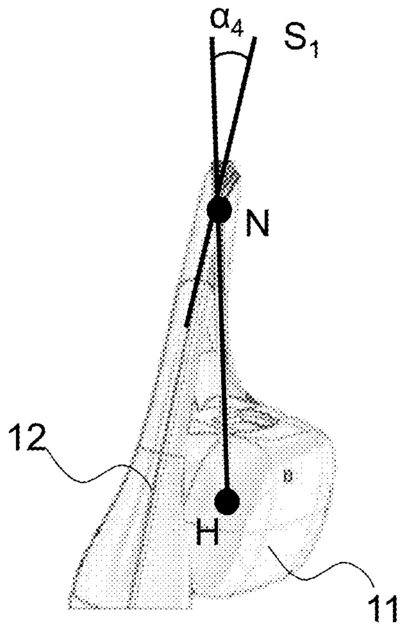
FIG. 10 is a schematic diagram illustrating an exemplary position of a mass center of a sound production component according to some embodiments of the present disclosure.

FIG. 10 is a schematic diagram illustrating an exemplary position of a mass center of a sound production component according to some embodiments of the present disclosure. Referring to FIG. 10, in some embodiments, in order to make the earphone 10 have a better listening effect, an included angle α4 between the connection line HN connecting the ear hook extremum point N and the mass center H of the sound production component 11 and the ear hook plane S1 may be within a range of 10°-18°. The ear hook plane S1 may be determined by the upper vertex K on the ear hook 12, the ear hook extremum point N, a point Q on the ear hook 12, and a point P on the ear hook 12, as shown in FIG. 3. In some embodiments, in order to further avoid the sound production component 11 from being too close to the ear canal opening, the included angle α4 between the connection line HN connecting the ear hook extremum point N and the mass center H of the sound production component 11 and the ear hook plane S1 may be within a range of 12°-16°. In some embodiments, in order to further enhance the listening effect, the included angle α4 between the connection line HN connecting the ear hook extremum point N and the mass center H of the sound production component 11 and the ear hook plane S1 may be within a range of 13°-14°.

Figure 11A:
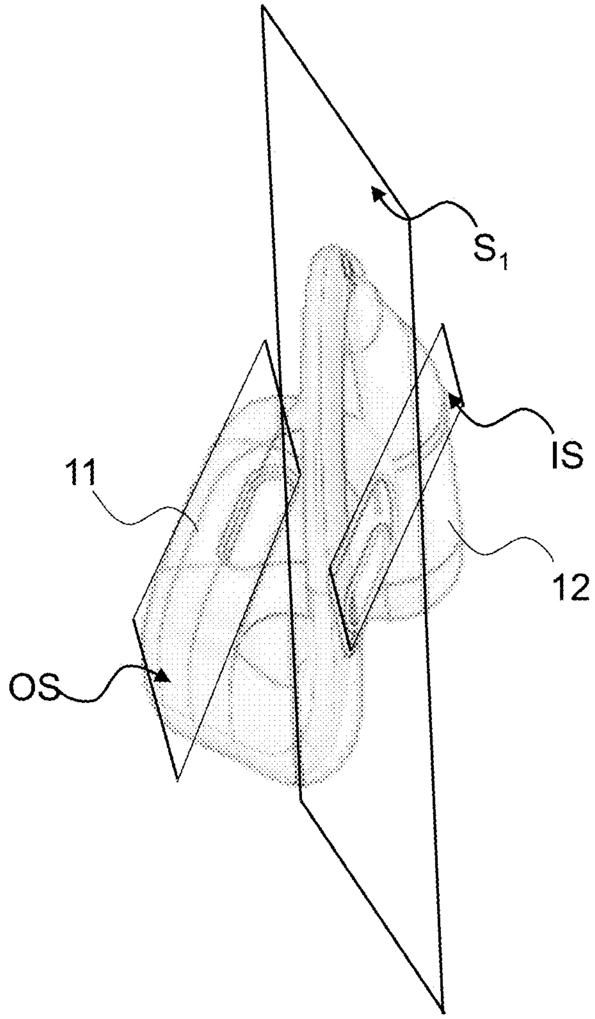
FIG. 11A is a schematic diagram illustrating exemplary positions of an inner side surface of a sound production component and an ear hook plane according to some embodiments of the present disclosure.
Figure 11B:
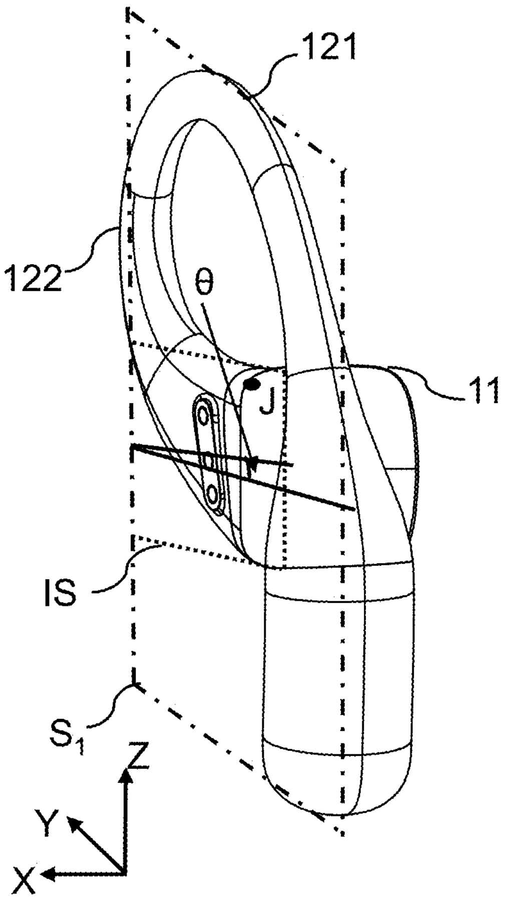
FIG. 11B is a schematic structural diagram illustrating an earphone in a non-wearing state according to some embodiments of the present disclosure.

FIG. 11A is a schematic diagram illustrating exemplary positions of an inner side surface of a sound production component and an ear hook plane according to some embodiments of the present disclosure. FIG. 11B is a schematic structural diagram illustrating an earphone in a non-wearing state according to some embodiments of the present disclosure.

The human head is approximately regarded as a quasi-sphere structure, and an auricle is a structure that protrudes relative to the head. When the user wears the earphone, part of the ear hook 12 may be attached to the head of the user. In order to make the sound production component 11 extend into the cavum concha 102, a certain included angle may be formed between the sound production component 11 and the ear hook plane S1. The included angle may be represented by an included angle between a plane corresponding to the sound production component 11 and the ear hook plane. In some embodiments, the plane corresponding to the sound production component 11 may be a plane where the inner side surface IS or the outer side surface OS of the sound production component 11 is located. In some embodiments, when the inner side surface IS and the outer side surface OS of the sound production component 11 are curved surfaces, a plane corresponding to the curved surface refers to a tangent plane corresponding to the curved surface at the center position or a plane that substantially coincides with a curve bounded by an edge contour of the curved surface. In some embodiments, taking a plane in which the inner side surface IS of the sound production component 11 is located as an example, an included angle θ is formed between the inner side surface IS and the ear hook plane S1. In some embodiments, the included angle θ may be measured by the following exemplary method. A projection of the inner side surface IS of the sound production component 11 on the XY plane and a projection of the ear hook 12 on the XY plane may be obtained along the short-axis direction Z of the sound production component 11, respectively. A first straight line may be drawn by selecting two most protruding points of a side of the projection of the ear hook 12 on the XY plane close to (or away from) the projection of the inner side surface IS of the sound production component 11 on the XY plane. When the projection of the inner side surface IS of the sound production component 11 on the XY plane is a straight line, an angle between the first straight line and the projection of the inner side surface IS on the XY plane is the included angle θ. When the projection of the inner side surface IS of the sound production component 11 on the XY plane is a curve, an included angle between the first straight line and the long-axis direction Y may be approximated as the included angle θ. It should be noted that the inclination angle θ of the sound production component 11 relative to the ear hook plane in both the wearing state and the non-wearing state of the earphone 10 may be measured using the above method. The difference lies in that in the non-wearing state, the inclination angle θ may be directly measured using the method; in the wearing state, the inclination angle θ may be measured using the method when the earphone 10 is worn on the human head model or an ear model.

In some embodiments, the included angle θ between the inner side surface IS or the outer side surface OS of the sound production component 11 and the ear hook plane S1 may also have an effect on the insertion of the sound production component 11 into the cavum concha. When the included angle θ is too large, it may cause the free end FE of the sound production component 11 to extend too much into the cavum concha, and cause the fixed end CE of the sound production component 11 connected to the ear hook 12 to be far away from the cavum concha, thus failing to form an effective cavity-like entity. When the included angle θ is too small, it may cause the free end FE of the sound production component 11 to extend too little into the cavum concha, resulting in too large a gap with the cavum concha, and cause the fixed end CE of the sound production component 11 connected to the ear hook 12 to cause a pressure on a tragus of the user.

As shown in FIG. 11A and FIG. 11B, in some embodiments, in order to ensure that the user may have a better listening effect while wearing the earphone 10, and at the same time to ensure the wearing stability, when the earphone 10 is in the wearing state, the included angle θ between the inner side surface IS or the outer side surface OS of the sound production component 11 and the ear hook plane S1 may be within a range of 15°-25°. In some embodiments, in order to further enhance the listening effect, when the earphone 10 is in the wearing state, the included angle θ between the inner side surface IS or the outer side surface OS of the sound production component 11 and the ear hook plane S1 may be within a range of 17°-23°. In some embodiments, in order to make the cavity-like structure formed by the sound production component 11 and the cavum concha have a more suitable volume and size/count of an opening, when the earphone 10 is in the wearing state, the included angle θ between the inner side surface IS or the outer side surface OS of the sound production component 11 and the ear hook plane S1 may be within a range of 19°-20°.

Due to the elasticity of the ear hook, the included angle θ between the inner side surface IS or the outer side surface OS of the sound production component 11 and the ear hook plane S1 may change to some extent in the wearing state and the non-wearing state. For example, the included angle θ in the non-wearing state is less than the included angle θ in the wearing state. In some embodiments, when the earphone 10 is in the non-wearing state, the included angle θ between the inner side surface IS or the outer side surface OS of the sound production component 11 and the ear hook plane S1 may be within a range of 15°-23°, so that when the earphone 10 is in the wearing state, its ear hook 12 may generate a certain clamping force on the ear of the user, thereby improving the wearing stability for the user without affecting the wearing experience of the user. In some embodiments, in order to further enhance the listening effect, the included angle θ between the inner side surface IS or the outer side surface OS of the sound production component 11 and the ear hook plane S1 in the non-wearing state may be within a range of 16.5°-21°. In some embodiments, in order to make the cavity-like structure formed by the sound production component 11 and the cavum concha have a more suitable volume and size/count of the opening, in the non-wearing state, the inclination angle of the sound production component 11 relative to the ear hook plane S1 may be within a range of 18°-20°.

In some embodiments, in the non-wearing state, by designing a maximum distance between the ear hook 12 and the inner side surface IS of the sound production component 11, in the wearing state of the earphone 10, the ear of the user may be well accommodated between the ear hook 12 and the sound production component 11, so that the ear hook 12 may be well adapted to the ear of the user, thereby improving the wearing comfort and stability of the earphone 10. If the maximum vertical distance between the ear hook 12 and the inner side surface IS of the sound production component 11 is too large, the wearing stability of the earphone 10 may be affected. If the maximum vertical distance between the ear hook 12 and the inner side surface IS of the sound production component 11 is too small, the adjustability of the earphone 10 may be affected.

Figure 12:
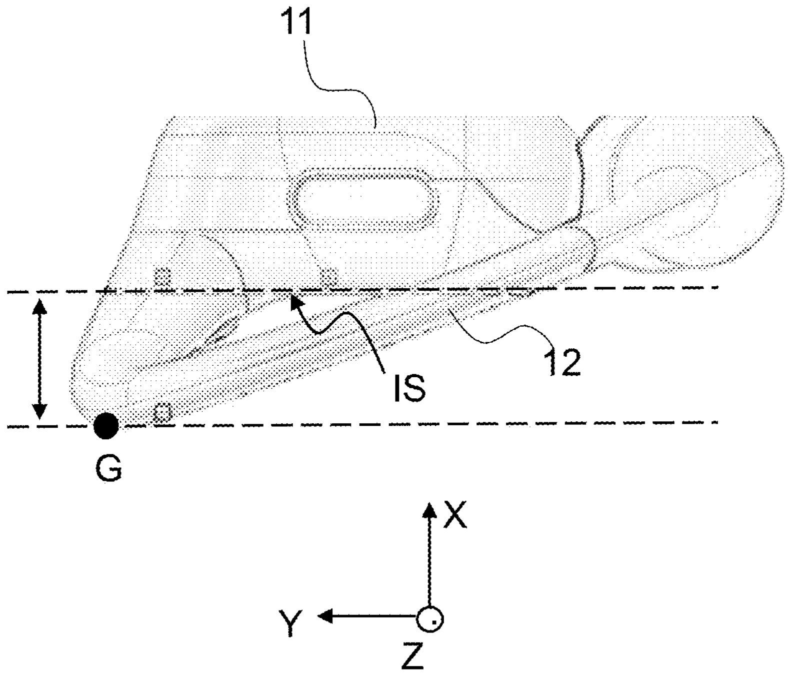
FIG. 12 is a schematic diagram illustrating an exemplary position of a point on an ear hook whose vertical distance is the farthest from an inner side surface of a sound production component according to some embodiments of the present disclosure.

FIG. 12 is a schematic diagram illustrating an exemplary position of a point on an ear hook whose vertical distance is the farthest from an inner side surface of a sound production component according to some embodiments of the present disclosure. As shown in FIG. 12, in some embodiments, on the XY plane, a point on the ear hook 12 which is farthest from the inner side surface IS of the sound production component 11 is point G. That is, in the X direction, the point on the ear hook 12 which is farthest from the inner side surface IS is point G. In some embodiments, a distance from a point on the ear hook 12 to the inner side surface IS is a distance between the point on the ear hook 12 and a projection point of the point on the inner side surface IS along a direction perpendicular to the inner side surface IS. In some embodiments, in order to provide the earphone 10 with better wearing stability and adjustability, the distance from the point G to the inner side surface IS of the sound production component 11 may be within a range of 6 mm-9 mm. That is, a farthest distance between the ear hook 12 and the inner side surface IS of the sound production component 11 may be within a range of 6 mm-9 mm. In some embodiments, to further enhance the wearing stability, the distance from the point G to the inner side surface IS of the sound production component 11 may be within a range of 7 mm-8 mm. In some embodiments, to further enhance adjustability, the distance from the point G to the inner side surface IS of the sound production component 11 may be within a range of 7.5 mm-7.9 mm.

When a size of the sound production component 11 in the thickness direction X is too small, volumes of a front cavity and a rear cavity formed by a vibration diaphragm of a transducer of the sound production component 11 and a housing of the sound production component 11 may be too small, the vibration amplitude may be limited, and a larger volume of sound may not be provided. When the size of the sound production component 11 in the thickness direction X is too large, the free end FE of the sound production component 11 is not able to completely abut against the edge of the cavum concha when in the wearing state, resulting in the earphone 10 being susceptible to dislodgement. The inner side surface IS of the sound production component 11 may have an included angle θ with the ear hook plane S1, and a distance from a point on the sound production component 11 which is farthest from the ear hook plane S1 to the ear hook plane S1 may be related to the size of the sound production component 11 in the thickness direction X. In some embodiments, since the sound production component 11 is arranged obliquely relative to the ear hook plane S1, the point on the sound production component 11 which is farthest from the ear hook plane S1 refers to an intersection point I of the fixed end CE of the sound production component 11 connected to the ear hook 12, the lower side surface LS, and the outer side surface OS, as shown in FIG. 3. Furthermore, the degree to which the sound production component 11 extends into the cavum concha may be determined by the distance between the point I on the sound production component 11 closest to the ear hook plane S1 and the ear hook plane S1. A point on the sound production component 11 which is closest to the ear hook plane S1 may be a point J that is an intersection point of the free end FE, the upper side surface US, and the inner side surface IS of the sound production component 11, as shown in FIG. 11B. By setting a distance between the point J on the sound production component 11 closest to the ear hook plane S1 and the ear hook plane S1 in a suitable range, a gap of a relatively small size may be formed between the sound production component 11 and the cavum concha while ensuring the wearing comfort of the user. In some embodiments, in order to ensure that the sound production component 11 may have a better acoustic output effect as well as to ensure stability and comfort when worn, in the wearing state of the earphone 10, the distance between the point I on the sound production component 11 farthest to the ear hook plane S1 and the ear hook plane S1 may be set within a range of 11.2 mm-16.8 mm, the distance between the point J on the sound production component 11 closest to the ear hook plane S1 and the ear hook plane S1 may be set within a range of 3 mm-5.5 mm. In some embodiments, in order to further enhance the acoustic output effect of the sound production component 11 and the wearing stability and comfort of the earphone 10, the distance between the point I on the sound production component 11 farthest to the ear hook plane S1 and the ear hook plane S1 may be set within a range of 12 mm-15.6 mm, the distance between the point J on the sound production component 11 closest to the ear hook plane S1 and the ear hook plane S1 may be set within a range of 3.8 mm-5 mm. In some embodiments, in order to further enhance the acoustic output effect of the sound production component 11 and the wearing stability and comfort of the earphones 10, the distance between the point I on the sound production component 11 farthest to the ear hook plane S1 and the ear hook plane S1 may be set within a range of 13 mm-15 mm, the distance between the point J on the sound production component 11 closest to the ear hook plane S1 and the ear hook plane S1 may be set within a range of 4 mm-5 mm.

The whole or part of the structure of the sound production component 11 extends into the cavum concha may form a cavity-like structure shown in FIG. 5, and the listening effect when the user wears the earphone 10 is related to a size of a gap formed between the sound production component 11 and an edge of the cavum concha. The smaller the size of the gap is, the greater the listening volume at the ear canal opening of the user. The size of the gap between the sound production component 11 and the edge of the cavum concha may be related not only to an inclination angle between the long-axis direction Y (a projection of the upper side surface US or the lower side surface LS on the sagittal plane) of the sound production component 11 and the horizontal direction but also to the size of the sound production component 11. For example, if the size of the sound production component 11 (especially a size along the short-axis direction Z illustrated in FIG. 13) is too small, the gap formed between the sound production component 11 and the edge of the cavum concha may be too large, which affects the listening volume at the ear canal opening of the user. When the size of the sound production component 11 (especially the size along the short-axis direction illustrated in FIG. 13) is too large, the sound production component 11 may have few parts extending into the cavum concha or the sound production component 11 may completely cover the cavum concha. At this time, the ear canal opening may be equivalent to being blocked, a connection between the ear canal opening and the external environment may not be realized, and the original design intention of the earphone may not be implemented. In addition, the excessively large size of the sound production component 11 may affect the wearing comfort of the user and the convenience of carrying around.

Figure 13:
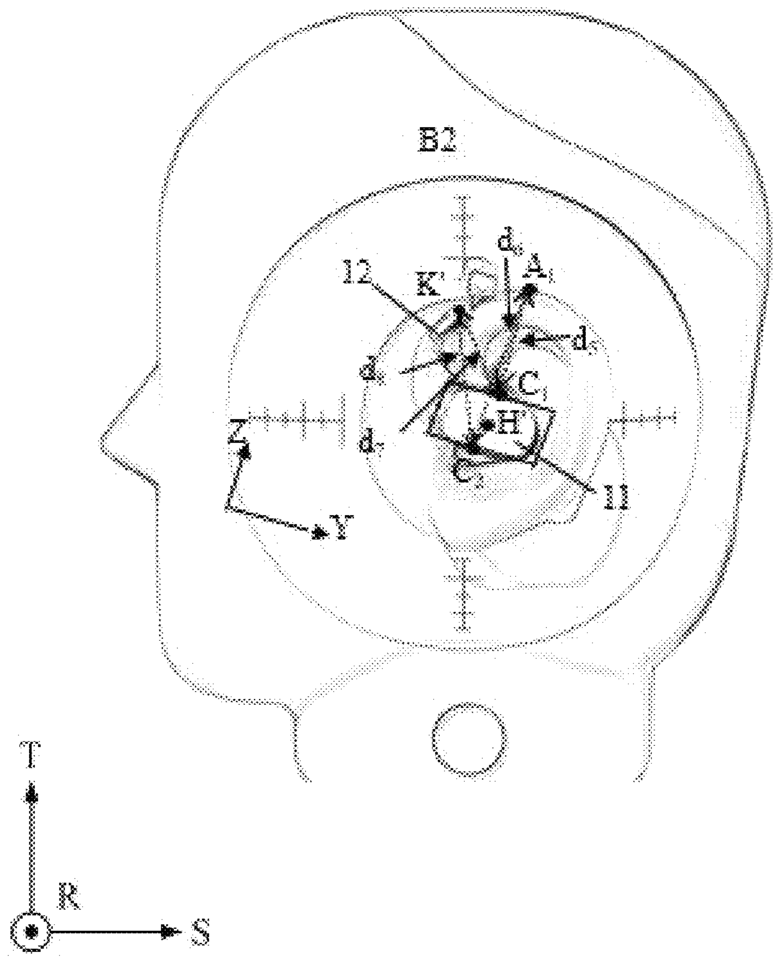
FIG. 13 is a schematic diagram illustrating an exemplary wearing state of an earphone according to some other embodiments of the present disclosure.

FIG. 13 is a schematic diagram illustrating an exemplary wearing state of an earphone according to some other embodiments of the present disclosure. As shown in FIG. 13, in some embodiments, in some embodiments, the distance between a midpoint of the projection of the upper side surface US and the lower side surface LS of the sound production component 11 on the sagittal plane and the highest point of the second projection may reflect the dimension of the sound production component 11 along the short-axis direction Z (the direction indicated by the arrow Z in FIG. 13) and the position of the sound production component 11 relative to the cavum concha. In order to improve the listening effect of the earphone 10 while ensuring that the earphone 10 does not block the ear canal opening of the user, in some embodiments, the distance d5 between the midpoint C1 of the projection of the upper side surface US of the sound production component 11 on the sagittal plane and the highest point A1 of the second projection may be within a range of 20 mm-38 mm, and a distance d6 between the midpoint C2 of the projection of the lower side surface LS of the sound production component 11 on the sagittal plane and the highest point A1 of the second projection may be within a range of 32 mm-57 mm. In some embodiments, in order to further avoid the earphone 10 from blocking the ear canal opening of the user and to enhance the listening effect of the earphone 10, the distance d5 between the midpoint C1 of the projection of the upper side surface US of the sound production component 11 on the sagittal plane and the highest point A1 of the second projection may be within a range of 24 mm-36 mm, and the distance d6 between the midpoint C2 of the projection of the lower side surface LS of the sound production component 11 on the sagittal plane and the highest point A1 of the second projection may be within a range of 36 mm-54 mm. In some embodiments, in order to further avoid the earphone 10 from blocking the ear canal opening of the user, and to enhance the listening effect of the earphone 10, the distance d5 between the midpoint C1 of the projection of the upper side surface US of the sound production component 11 on the sagittal plane and the highest point A1 of the second projection may be within a range of 27 mm-34 mm, and the distance d6 between the midpoint C2 of the projection of the lower side surface LS of the sound production component 11 on the sagittal plane and the highest point A1 of the second projection may be within a range of 38 mm-50 mm. It should be noted that when the projection of the upper side surface US of the sound production component 11 on the sagittal plane is the curved line or the broken line, the midpoint C1 of the projection of the upper side surface US of the sound production component 11 on the sagittal plane may be selected by the following example. A line segment may be drawn by selecting two farthest points on the projection of the upper side surface US on the sagittal plane along the long-axis direction Y, a mid-perpendicular line may be drawn by selecting a midpoint on the line segment, and an interaction point of the mid-perpendicular line and the projection may be the midpoint of the projection of the upper side surface US of the sound production component 11 on the sagittal plane. In some alternative embodiments, a point of the projection of the upper side surface US on the sagittal plane with the smallest distance from the highest point of the second projection may be selected as the midpoint C1 of the projection of the upper side surface US of the sound production component 11 on the sagittal plane. The midpoint of the projection of the lower side surface LS of the sound production component 11 on the sagittal plane may be selected in the same manner as above. For example, a point of the projection of the lower side surface LS on the sagittal plane with the largest distance from the highest point of the second projection may be selected as the midpoint C2 of the projection of the lower side surface LS of the sound production component 11 on the sagittal plane.

In some embodiments, distances between the midpoints of the projections of the upper side surface US and the lower side surface LS of the sound production component 11 on the sagittal plane and the projection point K' of the upper vertex K of the ear hook on the sagittal plane may reflect the size of the sound production component 11 along the short-axis direction Z (a direction illustrated in FIG. 3 by the arrow Z). In order to ensure the earphone 10 not blocking the ear canal opening of the user while improving the listening effect of the earphone 10, in some embodiments, the distance d7 between the midpoint C1 of the projection of the upper side surface US of the sound production component 11 on the sagittal plane and the projection point K' of the upper vertex K of the ear hook on the sagittal plane may be within a range of 17 mm-36 mm, and the distance d8 between the midpoint C2 of the projection of the lower side surface LS of the sound production component 11 on the sagittal plane and the projection point K' of the upper vertex K of the ear hook on the sagittal plane may be within a range of 28 mm-52 mm. In some embodiments, in order to further prevent the earphone 10 from blocking the ear canal opening of the user and to enhance the listening effect of the earphone 10, the distance d7 between the midpoint C1 of the projection of the upper side surface US of the sound production component 11 on the sagittal plane and the projection point K' of the upper vertex K of the ear hook on the sagittal plane may be within a range of 21 mm-32 mm, and the distance d8 between the midpoint C2 of the projection of the lower side surface LS of the sound production component 11 on the sagittal plane and the projection point K' of the upper vertex K of the ear hook on the sagittal plane may be within a range of 32 mm-48 mm. In some embodiments, in order to further prevent the earphone 10 from blocking the ear canal opening of the user and enhancing the listening effect of the earphone 10, the distance d7 between the midpoint C1 of the projection of the upper side surface US of the sound production component 11 on the sagittal plane and the projection point K' of the upper vertex K of the ear hook on the sagittal plane may be within a range of 24 mm-30 mm, and the distance d8 between the midpoint C2 of the projection of the lower side surface LS of the sound production component 11 on the sagittal plane and the projection point K' of the upper vertex K of the ear hook on the sagittal plane may be within a range of 35 mm-45 mm.

Figure 14A:
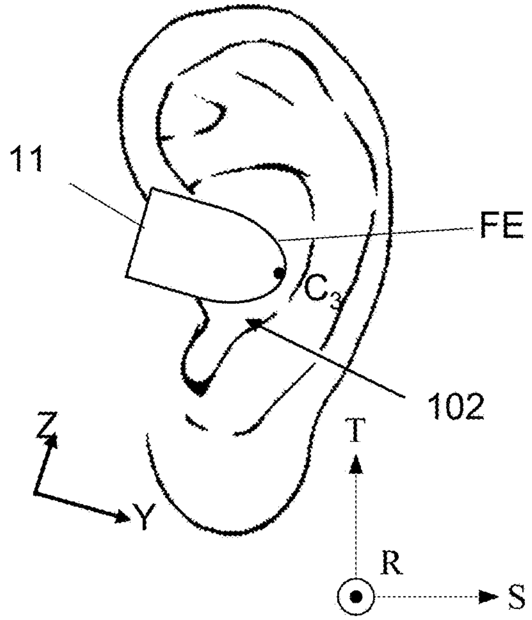
FIG. 14A-FIG. 14C are schematic diagrams illustrating different exemplary matching positions between an open earphone and an ear canal of a user according to some embodiments of the present disclosure.
Figure 14B:
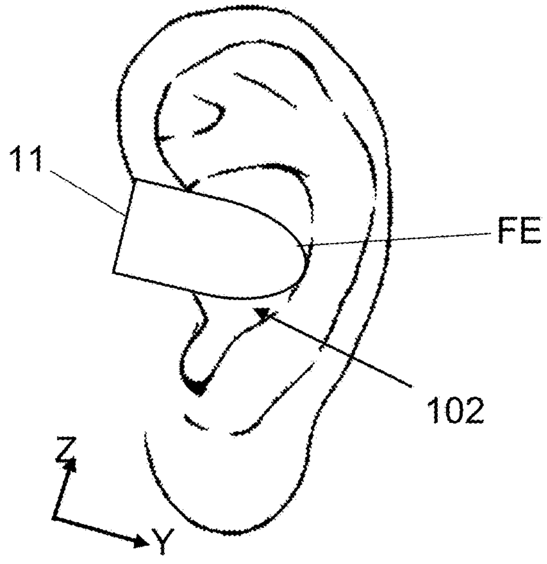
Figure 14C:
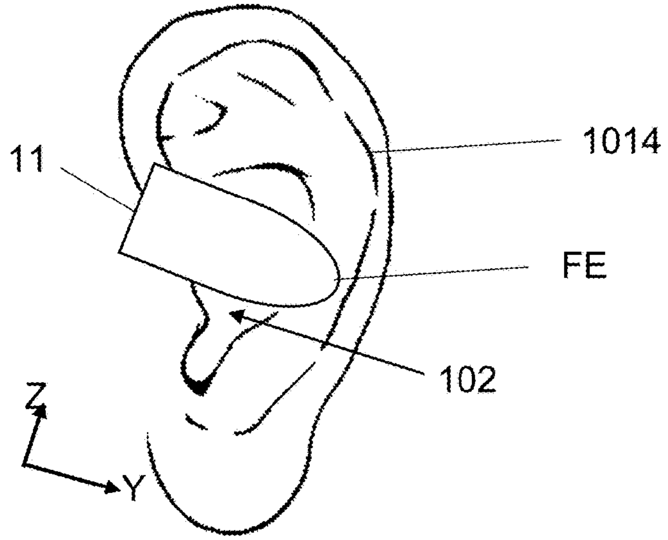

FIG. 14A-FIG. 14C are schematic diagrams illustrating different exemplary matching positions between an open earphone and an ear canal of a user according to some embodiments of the present disclosure.

A size of a gap formed between the sound production component 11 and an edge of the cavum concha may be related to an included angle between the long-axis direction Y of a projection of the sound production component 11 on a user's sagittal plane and the horizontal direction, a size of the sound production component 11 (e.g., the dimension along the short-axis direction Z shown in FIG. 3), and a distance of the free end FE of the sound production component 11 relative to the edge of the cavum concha. Specifically, the fixed end CE of the sound production component 11 may be connected to the second portion 122 of the ear hook 12, which is positioned relatively forwardly when worn by a user, and the distance of the free end FE of the sound production component 11 relative to the fixed end CE may reflect the size of the sound production component 11 along the long-axis direction (the direction shown by the arrow Y illustrated in FIG. 3). Therefore, a position of the free end FE of the sound production component 11 relative to the cavum concha may affect an area of the cavum concha that is covered by the sound production component 11, and thus the size of the gap formed between the sound production component 11 and the contour of the cavum concha, which in turn affects the listening volume at the ear canal opening of the user. A distance from the midpoint C3 of a projection of the free end FE of the sound production component 11 on the sagittal plane (shown in FIG. 14A-FIG. 14C) to a projection of the edge of the cavum concha on the sagittal plane may reflect a position of the free end FE of the sound production component 11 relative to the cavum concha and an extent to which the sound production component 11 covers the cavum concha of the user. It should be noted that when the projection of the end FE of the sound production component 11 on the sagittal plane is a curve line or a folded line, the midpoint C3 of the projection of the free end FE of the sound production component 11 on the sagittal plane may be selected by the following exemplary method. A line segment may be drawn by selecting two points that have the farthest distance on the projection of the free end FE on the sagittal plane along the short-axis direction, a mid-perpendicular line may be drawn by selecting a midpoint on the line segment, and an interaction point of the mid-perpendicular line with the projection may be the midpoint C3 of the projection of the free end FE of the sound production component 11 on the sagittal plane. In some embodiments, when the free end FE of the sound production component 11 is a curved surface, a tangent point where a tangent line parallel to the short-axis direction Z on the projection may also be selected as the midpoint C3 of the projection of the free end FE of the sound production component 11 on the sagittal plane.

As shown in FIG. 14A, when the sound production component 11 does not abut against the edge of the cavum concha 102, the free end FE of the sound production component 11 may be located in the cavum concha 102, i.e., the midpoint C3 of the projection of the free end FE of the sound production component 11 on the sagittal plane may not overlap with the projection of the edge of the cavum concha 102 on the sagittal plane. As shown in FIG. 14B, the sound production component 11 of the earphone 10 may extend into the cavum concha 102, and the free end FE of the sound production component 11 may abut against the edge of the cavum concha 102. It should be noted that, in some embodiments, when the free end FE of the sound production component 11 abuts against the edge of the cavum concha 102, the midpoint C3 of the projection of the free end FE of the sound production component 11 on the sagittal plane may overlap with the edge of the cavum concha 102 on the sagittal plane. In some embodiments, when the free end FE of the sound production component 11 abuts against the edge of the cavum concha 102, the midpoint C3 of the projection of the free end FE of the sound production component 11 on the sagittal plane may not overlap with the projection of the edge of the cavum concha 102 on the sagittal plane. For example, the cavum concha 102 may be a concave structure, a sidewall corresponding to the cavum concha 102 may not be a flat wall surface, and the projection of the edge of the cavum concha on the sagittal plane may be an irregular two-dimensional shape. A projection of the sidewall corresponding to the cavum concha 102 on the sagittal plane may be on or outside a contour of the shape. Thus, the midpoint C3 of the projection of the free end FE of the sound production component 11 on the sagittal plane may not overlap with the projection of the edge of the cavum concha 102 on the sagittal plane. For example, the midpoint C3 of the projection of the free end FE of the sound production component 11 on the sagittal plane be located on an inner side or an outer side of the projection of the edge of the cavum concha 102 on the sagittal plane. In the embodiments of the present disclosure, when the free end FE of the sound production component 11 is located in the cavum concha 102, the distance from the midpoint C3 of the projection of the free end FE of the sound production component 11 to the projection of the edge of the cavum concha 102 on the sagittal plane may be within a specific range (e.g., not greater than 6 mm), which may be considered that the free end FE of the sound production component 11 may abut against the edge of the cavum concha 102. As shown in FIG. 14C, the sound production component 11 of the earphone 10 covers the cavum concha, and the free end FE of the sound production component 11 may be located between the edge of the cavum concha 102 and the inner contour 1014 of the ear.

Referring to FIGS. 14A-14C, when the free end FE of the sound production component 11 is located in the edge of the cavum concha 102, if the distance from the midpoint C3 of the projection of the free end FE of the sound production component 11 on the sagittal plane to the projection of the edge of the cavum concha 102 on the sagittal plane is too small, the area of the cavum concha 102 covered by the sound production component 11 may be too small, and the size of the gap formed between the sound production component 11 and the edge of the cavum concha may be relatively large, which may affect the listening volume at the ear canal opening of the user. When the midpoint C3 of the projection of the free end FE of the sound production component on the sagittal plane is located at a position between the projection of the edge of the cavum concha 102 on the sagittal plane and a projection of the inner contour 1014 of the auricle on the sagittal plane, if the distance between the midpoint C3 of the projection of the free end FE of the sound production component 11 on the sagittal plane and the projection of the edge of the cavum concha 102 on the sagittal plane is too large, the free end FE of the sound production component 11 may interfere with the auricle, and the area of the cavum concha 102 covered by the sound production component 11 may not be increased. In addition, when the user wears the earphone, if the free end FE of the sound production component 11 is not located in the cavum concha 102, the edge of the cavum concha 102 may not limit the sound production component 11, and the earphone may be liable to fall off. In addition, an increase in the size of the sound production component 11 in a certain direction may increase weight of the sound production component 11, which may affect the wearing comfort and portability of the user. Accordingly, in order to ensure that the earphone 10 has a better listening effect and the wearing comfort and stability of the user, in some embodiments, the distance between the midpoint C3 of the projection of the free end FE of the sound production component 11 on the sagittal plane and the projection of the edge of the cavum concha on the sagittal plane may not be greater than 16 mm. In some embodiments, in order to further improve the wearing stability and comfort, the distance between the midpoint C3 of the projection of the free end FE of the sound production component 11 on the sagittal plane and the projection of the edge of the cavum concha on the sagittal plane may not be greater than 13 mm. In some embodiments, in order to further improve the wearing stability and comfort, the distance between the midpoint C3 of the projection of the free end FE of the sound production component 11 on the sagittal plane and the projection of the edge of the cavum concha on the sagittal plane may not be greater than 8 mm. It should be noted that, in some embodiments, the distance between the midpoint C3 of the projection of the free end FE of the sound production component 11 on the sagittal plane and the projection of the edge of the cavum concha 102 on the sagittal plane may be a minimum distance between the midpoint C3 of the projection of the free end FE of the sound production component 11 on the sagittal plane and the projection of the edge of the cavum concha 102 on the sagittal plane. In some embodiments, the distance between the midpoint C3 of the projection of the free end FE of the sound production component 11 on the sagittal plane and the projection of the edge of the cavum concha 102 on the sagittal plane also refers to a distance along the sagittal axis. In addition, in a specific wearing scenario, it may also be noted that points, other than the midpoint C3, of the projection of the free end FE of the sound production component 11 on the sagittal plane may abut against the edge of the cavum concha. At this time, the distance between the midpoint C3 of the projection of the free end FE of the sound production component 11 on the sagittal plane and the projection of the edge of the cavum concha on the sagittal plane may be greater than 0 mm. In some embodiments, in order to further enhance the listening effect as well as the wearing stability and comfort of the earphone 10, the distance between the midpoint C3 of the projection of the free end FE of the sound production component 11 on the sagittal plane and the projection of the edge of the cavum concha on the sagittal plane may be within a range of 2 mm-16 mm. In some embodiments, in order to further enhance the listening effect as well as the wearing stability and comfort of the earphone 10, the distance between the midpoint C3 of the projection of the free end FE of the sound production component 11 on the sagittal plane and the projection of the edge of the cavum concha on the sagittal plane may be within a range of 4 mm-10.48 mm.

In some embodiments, by designing features (e.g., an extremum point, etc.) of the first curve L1 included in the inner contour of the projection of the ear hook 12 on the user's sagittal plane, a shape and size of the ear hook 12 may be determined. On the one hand, the position of the sound production component 11 relative to the ear of the user in the wearing state may be adjusted, the listening effect of the earphone 10 may be improved, and on the other hand, the compatibility of the ear hook 12 with the ear of the user may be improved, thereby improving the wearing stability and comfort of the earphone 10.

Figure 15:
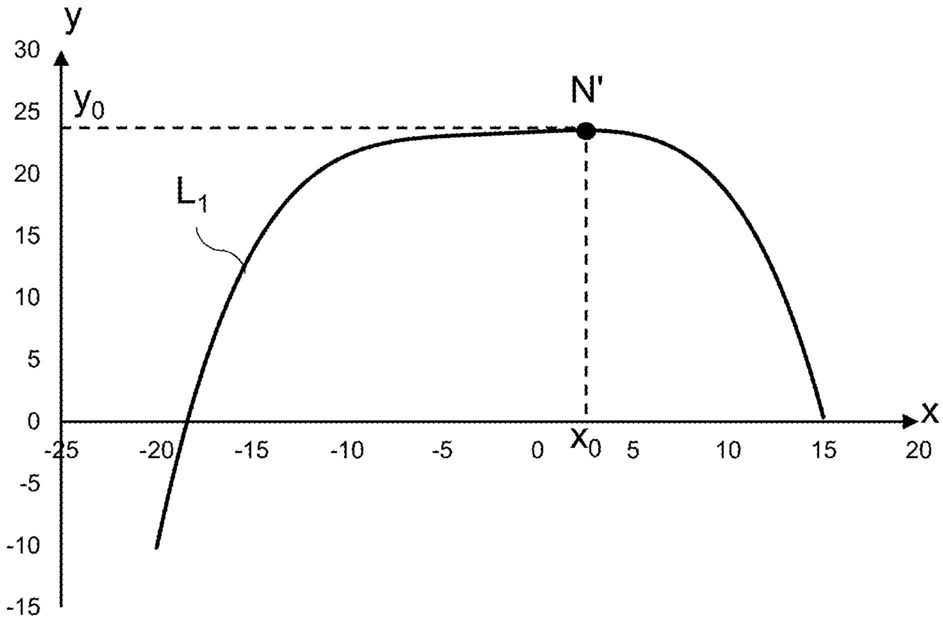
FIG. 15 is a schematic diagram illustrating an exemplary fitting function curve of a first curve according to some embodiments of the present disclosure.

FIG. 15 is a schematic diagram illustrating an exemplary fitting function curve of a first curve according to some embodiments of the present disclosure. As shown in FIG. 4 and FIG. 15, in some embodiments, the extremum point N' of the first curve L1 may be determined by curve fitting. It should be noted that if a position of an origin of an xoy coordinate system changes (e.g., positions of the x-axis and/or the y-axis change), a fitting function equation of the first curve L1 may also change correspondingly. Merely by way of example, the x-axis of the xoy coordinate system is arranged in the position of the long-axis of the projection of the sound production component 11 (the long-axis is a connection line connecting two endpoints with the largest extension size in the shape of the projection of the sound production component 11), and the y-axis is arranged 13 mm behind the projection point K' of the upper vertex K. Thus, by fitting the first curve L1 in this xoy coordinate system using a univariate quartic polynomial function, an exemplary fitting function equation for the first curve L1 can be obtained in the xoy coordinate system:

$$y=-0.0003059^{*}x^{\wedge}4-0.002301^{*}x^{\wedge}3-0.004005^{*}x^{\wedge}2+ \quad \text{(Equation 1)}$$

-continued $$0.07309{}^*x + 23.39.$$

In some embodiments, in order to enable an image of the fitting function equation to include the first curve L1, a value of an independent variable x of the fitting function equation may be relatively large, so that two end points (point P and point Q) of the first curve L1 are included, and the fitting function equation may completely reflect the features of the first curve L1. In some embodiments, the range of the value of the independent variable x of the fitting function equation (i.e., the equation 1) is [−20, 15], i.e., $-20 \leq x \leq 15$. Further, in order to reduce a part of an image of the fitting function equation (i.e., the equation 1) that does not correspond to the first curve L1 to enable the fitting function equation to reflect the features of the first curve L1 accurately, the range of the value of the independent variable x of the fitting function equation (i.e., the equation 1) is [−18, 12], i.e., $-18 \leq x \leq 12$.

In some embodiments, the first portion 121 and the second portion 122 of the ear hook 12 may be demarcated by a point Q. A right end point of the range of the value of the independent variable x of the fitting function equation (i.e., the equation 1) may be a corresponding value of the projection point Q' of the point Q on the user's sagittal plane on the x-axis. By designing the first curve L1, a position of the point Q may be determined, so as to adjust a demarcation point between the first portion 121 and the second portion 122. Since the second portion 122 of the ear hook extends toward a side of the auricle back away from the head and connects the sound production component 11, by adjusting the demarcation point between the first portion 121 and the second portion 122, the position of the sound production component 11 relative to the ear hook 12 may be changed, thereby changing the position of the sound production component 11 relative to the ear in the wearing state.

By calculating an independent variable x0 corresponding to a first derivative y'=0 of equation 1, an abscissa of the extremum point N' of the first curve L1 in the xoy coordinate system may be determined (a method for determining the extremum point may be found in related descriptions hereinafter), and then the coordinates of the extremum point N' in the xoy coordinate system are determined by substituting the independent variable x0 into the equation 1. In equation 1 mentioned above, the coordinates of the extremum point N' are (2.3544, 23.5005).

It should be noted that a function equation (e.g., equation 1) of the first curve L1 obtained by polynomial fitting is an approximate expression of the first curve L1. When a count of sampling points for fitting the function equation is large (e.g., greater than 10) and evenly distributed, a curve represented by the function equation may be considered as the first curve L1. The function equation fitted in the present disclosure is only an example, mainly used to describe the features (including an extremum point, an inflection point, a first derivative, a second derivative, etc.) of the first curve L1. The specific function equation (e.g., equation 1) of the first curve L1 is related to the selection of the origin o of the coordinate system xoy. The function equation is different when the origin o is different. However, in the case of a horizontal axis (x-axis) and a vertical axis (y-axis) of the coordinate system remaining unchanged, relative positions of the features of the first curve L1 such as the extremum point and the inflection point on the first curve L1 are certain, and properties of the first derivative and the second derivative of the first curve L1 are also certain, which do not vary with a position of the origin o of the coordinate system xoy. The present disclosure is non-limiting to the selection of the origin o of the coordinate system xoy for fitting the first curve L1 and the equation of the first curve L1. For example, in order to determine a position relationship between the extremum point and the upper vertex, the y-axis of the coordinate system xoy may be set to pass through the projection point K' of the upper vertex K, and the equation of the first curve L1 may change accordingly.

In some embodiments, the first derivative y' and the second derivative y" of the function equation y of the first curve L1 may be further determined. By calculating the abscissa x0 corresponding to the first derivative y'=0, and then determining whether a value of the second derivative y" corresponding to x0 is positive or negative, whether the extremum point N' is a maximum point or a minimum point may be determined. If a value of the second derivative y" corresponding to x0 is greater than 0, a corresponding coordinate point (x0, y0) is a minimum point; if the value of the second derivative y" corresponding to x0 is less than 0, then the corresponding coordinate point (x0, y0) is a maximum point. In some embodiments, the extremum point N' of the first curve L1 is a maximum point.

In some embodiments, the extremum point N' of the first curve L1 may also be determined in other ways. For example, the extremum point N' of the first curve L1 may be determined by determining a function value y and a function value y0 corresponding to different values in intervals near the left and right sides of x0, by determining a positivity and negativity difference of the values y' of the first derivative corresponding to the different values in intervals near the left and right sides of x0, etc., which are not limited in the present disclosure.

In some embodiments, instead of determining the extremum point N' of the first curve L1 by fitting the function equation of the first curve L1, the extremum point N' of the first curve L1 may be determined in other ways. For example, on a projection of the earphone 10 on the user's sagittal plane (the projection may be obtained by taking a picture directly facing the user's sagittal plane), a scale perpendicular to the long-axis direction Y is taken along the long-axis direction Y to move from point P' to point Q' of the first curve L1, and during the movement, when an intersection point between the first curve L1 and the scale has a maximum value on the scale, the intersection point is the extremum point N' of the first curve L1.

Figure 16:
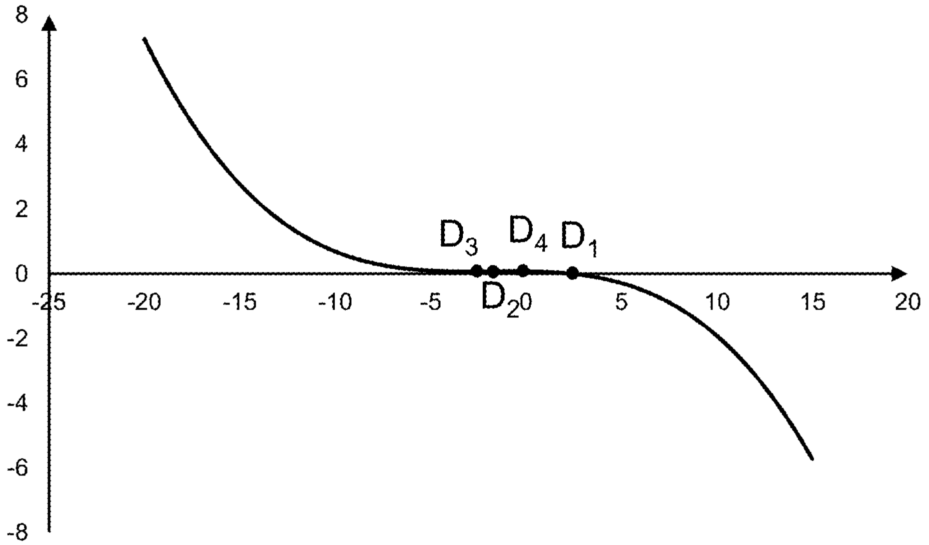
FIG. 16 is a schematic diagram illustrating an exemplary first derivative curve of a fitting curve according to some embodiments of the present disclosure.

FIG. 16 is a schematic diagram illustrating an exemplary first derivative curve of a fitting curve according to some embodiments of the present disclosure. As shown in FIG. 16, in some embodiments, for the first curve L1, which has a first derivative:

$$y' = -0.0012236{}^*x^{\wedge}3 - 0.006903{}^*x^{\wedge}2 - 0.00801{}^*x + 0.07309. \quad \text{(Equation 2)}$$

In some embodiments, the first derivative of the first curve L1 is continuous.

In some embodiments, the first derivative of the first curve L1 (i.e., equation 2) has a zero point (point D1), i.e., equation y'=0 has one solution, which corresponds to an abscissa of point D1. In some embodiments, according to equation 2, it may be determined that the coordinates of point D1 are (2.3544, 0). The abscissa of point D1 is substituted into equation 1 of the first curve L1, it may be known that a point of the first curve L1 corresponding to the abscissa of point D1 is a point having the maximum value of the first curve L1 in the xoy coordinate system, and the point is also the maximum point of the first curve L1 so that the point may be recorded as the extremum point N' of the first curve L1.

In some embodiments, in the first rectangular coordinate system xoy, the first derivative of the first curve L1 has one or more inflection points. In some embodiments, in the first rectangular coordinate system xoy, a count of the one or more inflection points of the first derivative of the first curve L1 is one, i.e., point D2. As shown in FIG. 16, on a left side of point D2, an image curve of the first derivative is a concave function; on a right side of point D2, the image curve of the first derivative is a convex function. The point D2 is a change point of concavity and convexity of the image curve of the first derivative, and is an inflection point of the first derivative.

In some embodiments, in the first rectangular coordinate system xoy, parts on both sides of the inflection point of the first derivative of the first curve L1 respectively have extremum points (point D3 and point D4), as shown in FIG. 16. Curves of the first derivative of the first curve L1 on the left side and the right side near point D3 are located above point D3, i.e., in regions on the left side and right side near point D3, a function value of the first derivative corresponding to point D3 is the smallest, and point D3 is the minimum point of the first derivative. Curves of the first derivative of the first curve L1 on the left side and the right side near point D4 are located below point D4, i.e., in regions on the left side and the right side near point D4, the function value of the first derivative corresponding to point D4 is the largest, and point D4 is the maximum point of the first derivative.

In some embodiments, the extremum point of the first derivative of the first curve L1 may also be determined according to a second derivative and a third derivative of the first curve L1, detailed descriptions of which may refer to a method for determining the extremum point of the first curve L1, which are not repeated here.

In some embodiments, according to equation 2, the coordinates of point D3 may be determined as (−3.0442, 0.0680), and the coordinates of point D4 may be determined as (−0.7168, 0.0757).

Figure 17:
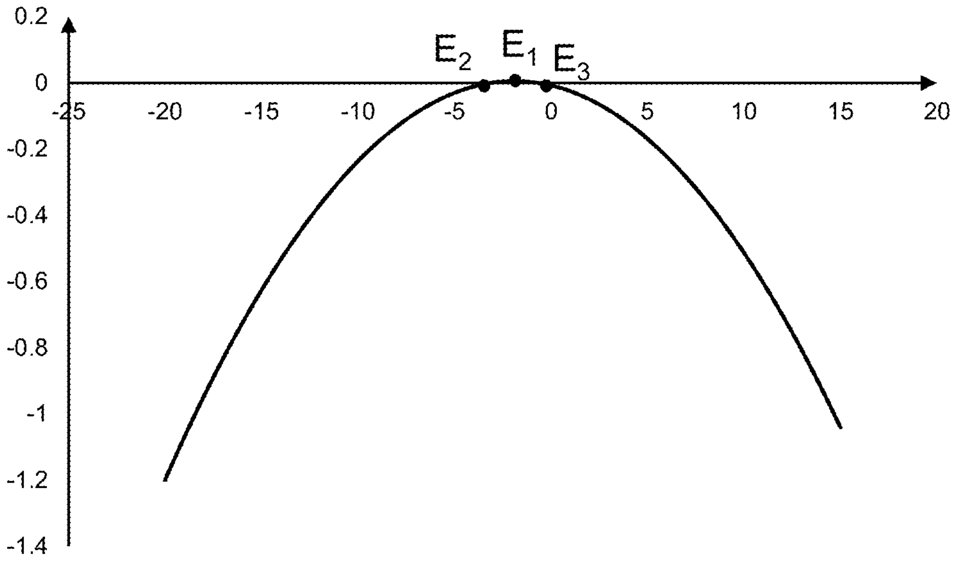
FIG. 17 is a schematic diagram illustrating an exemplary second derivative curve of a fitting curve according to some embodiments of the present disclosure.

FIG. 17 is a schematic diagram illustrating an exemplary second derivative curve of a fitting curve according to some embodiments of the present disclosure. As shown in FIG. 17, in some embodiments, the first curve L1 has a second derivative:

$$y'' = -0.0036708{*}x{\wedge}2 - 0.013806{*}x - 0.00801. \quad \text{(Equation 3)}$$

In some embodiments, the second derivative of the first curve L1 is continuous.

In some embodiments, in the first rectangular coordinate system xoy, the second derivative of the first curve L1 has a maximum point, i.e., point E1. As shown in FIG. 17, curves of the second derivative of a fitting curve L2 on the left side and the right side near point E1 are all located below point E1, i.e., in regions on the left side and the right side near point E1, a function value of the second derivative corresponding to point E1 is the largest, and point E1 is the maximum point of the second derivative.

In some embodiments, the second derivative of the first curve L1 has two zero points (i.e., point E2 and point E3), and an abscissa of point E2 corresponds to an abscissa of the extremum point D3 of the first derivative, i.e., x=−0.30442. An abscissa of point E3 corresponds to an abscissa of the extremum point D4 of the first derivative, i.e., x=−0.7168.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms “one embodiment,” “an embodiment,” and/or “some embodiments” mean that a particular feature, structure, or feature described in connection with the embodiment is included in at least one embodiment of the present disclosure. Therefore, it is emphasized and should be appreciated that two or more references to “an embodiment” or “one embodiment” or “an alternative embodiment” in various portions of the present disclosure are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term “about,” “approximate,” or “substantially.” For example, “about,” “approximate” or “substantially” may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

The specific embodiments documented in the present disclosure are examples only, and one or more technical features in the specific embodiments are optional or additional, and are not necessary technical features constituting the inventive conception of the present disclosure. In other words, the protection scope of the present disclosure encompasses and is much larger than the specific embodiments.

What is claimed is:

1. An earphone comprising:

a sound production component including a transducer and a housing for accommodating the transducer; and an ear hook, wherein in a wearing state, a first portion of the ear hook is hung between an auricle and a head of a user, a second portion of the ear hook connects with the first portion of the ear hook, the second portion of the ear hook extends towards a side of the auricle away from the head and connects to the sound production component to place the sound production component at a position near an ear canal but not blocking an ear canal opening, wherein an inner contour of a projection of the ear hook on a user's sagittal plane includes a first curve, the first curve has an extremum point in a first direction, and the first direction is perpendicular to a long-axis direction of a projection of the sound production component on the user's sagittal plane;

the extremum point is located behind a projection point of an upper vertex of the ear hook on the user's sagittal plane, and the upper vertex is a highest point of an inner contour of the ear hook along a vertical axis of the user in the wearing state; and in the wearing state, a distance between a midpoint of a projection of an upper side surface of the sound production component on the user's sagittal plane and the projection point of the upper vertex on the user's sagittal plane is within a range of 17 mm-36 mm.

2. The earphone of claim 1, wherein in the wearing state, a distance between a midpoint of a projection of a lower side surface of the sound production component on the user's sagittal plane and the projection point of the upper vertex on the user's sagittal plane is within a range of 28 mm-52 mm.

3. The earphone of claim 2, wherein in the wearing state, a distance between the midpoint of the projection of the upper side surface of the sound production component on the user's sagittal plane and a highest point of a projection of the auricle on the user's sagittal plane is within a range of 24 mm-36 mm.

4. The earphone of claim 3, wherein in the wearing state, a distance between the midpoint of the projection of the lower side surface of the sound production component on the user's sagittal plane and the highest point of the projection of the auricle on the user's sagittal plane is within a range of 28 mm-52 mm.

5. The earphone of claim 1, wherein in a non-wearing state, a distance from a point on the ear hook farthest from an inner side surface of the sound production component to the inner side surface of the sound production component is within a range of 6 mm-9 mm.

6. The earphone of claim 1, wherein in a non-wearing state, a distance from a point on the sound production component farthest from an ear hook plane to the ear hook plane is within a range of 11.2 mm-16.8 mm.

7. The earphone of claim 1, wherein in a wearing state, a distance from a midpoint of a projection of a free end of the sound production component on the user's sagittal plane to a projection of an edge of the cavum concha on the user's sagittal plane is not greater than 16 mm.

8. The earphone of claim 1, wherein in a wearing state, a first distance exists between a centroid of the projection of the sound production component on the user's sagittal plane and a highest point of a projection of the auricle on the user's sagittal plane in a vertical-axis direction, a ratio of the first distance to a height of the projection of the auricle on the user's sagittal plane in the vertical-axis direction is within a range of 0.25-0.6; and a second distance exists between the centroid of the projection of the sound production component on the user's sagittal plane and an end point of the projection of the auricle on the user's sagittal plane in a sagittal-axis direction, and a ratio of the second distance to a width of the projection of the auricle on the user's sagittal plane in the sagittal-axis direction is within a range of 0.4-0.7.

9. The earphone of claim 8, wherein in the wearing state, at least part of the sound production component covers an antihelix region of the user, the ratio of the first distance to the height of the projection of the auricle on the user's sagittal plane in the vertical-axis direction is within a range of 0.25-0.4, and the ratio of the second distance to the width of the projection of the auricle on the user's sagittal plane in the sagittal-axis direction is within a range of 0.4-0.6.

10. The earphone of claim 1, wherein in a wearing state, at least part of the sound production component covers an antihelix region of the user, a distance from a centroid of the projection of the sound production component on the user's sagittal plane to a contour of a projection of the auricle on the user's sagittal plane is within a range of 13 mm-54 mm.

11. The earphone of claim 1, wherein a distance between the projection point of the upper vertex on the user's sagittal plane and a centroid of the projection of the sound production component on the user's sagittal plane is within a range of 20 mm-30 mm.

12. The earphone of claim 1, wherein an included angle between a connection line connecting the projection point of the upper vertex on the user's sagittal plane and a centroid of the projection of the sound production component on the user's sagittal plane and the long-axis direction of the projection of the sound production component is within a range of 45°-65°.

13. The earphone of claim 1, wherein an inclination angle of the long-axis direction of the projection of the sound production component on the user's sagittal plane relative to a horizontal direction is within a range of 13°-21°.

14. The earphone of claim 13, wherein a distance between the extremum point and the projection point of the upper vertex on the user's sagittal plane is within a range of 6 mm-15 mm along the long-axis direction of the projection of the sound production component.

15. The earphone of claim 13, wherein a distance between the extremum point and a centroid of the projection of the sound production component on the user's sagittal plane is within a range of 20 mm-30 mm.

16. The earphone of claim 13, wherein an included angle between a connection line connecting the extremum point and a centroid of the projection of the sound production component on the user's sagittal plane and the long-axis direction of the projection of the sound production component is within a range of 65°-85°.

17. The earphone of claim 1, wherein a distance from a centroid of the projection of the sound production component on the user's sagittal plane to a projection of the first portion of the ear hook on the user's sagittal plane is within a range of 18 mm-43 mm.

18. The earphone of claim 1, wherein a first derivative of the first curve in a first preset coordinate system is continuous, a vertical axis of the first preset coordinate system is parallel to the first direction, and a horizontal axis of the first preset coordinate system is parallel to the long-axis direction of the projection of the sound production component.

19. The earphone of claim 18, wherein the first derivative of the first curve in the first preset coordinate system has one or more inflection points.

20. The earphone of claim 18, wherein a second derivative of the first curve in the first preset coordinate system is continuous.

* * * * *